US010599782B2

(12) United States Patent
Rojas et al.

(10) Patent No.: US 10,599,782 B2
(45) Date of Patent: Mar. 24, 2020

(54) ANALYTICAL OPTIMIZATION OF TRANSLATION AND POST EDITING

(71) Applicant: International Business Machines Corporation, Armonk, NY (US)

(72) Inventors: Francis X Rojas, Austin, TX (US); Saroj K Vohra, New Fairfield, CT (US); Mauricio Kaoru Noriyuki, Cotia (BR); Almiro Jose Andrade, Jr., Capuava-Valinhos (BR); Bianca Bonetto Leal Rodrigues, Nova Odessa (BR); Patricia Pavan Esposito, Dundiai (BR)

(73) Assignee: International Business Machines Corporation, Armonk, NY (US)

( * ) Notice: Subject to any disclaimer, the term of this patent is extended or adjusted under 35 U.S.C. 154(b) by 18 days.

(21) Appl. No.: 15/984,522

(22) Filed: May 21, 2018

(65) Prior Publication Data

US 2019/0354593 A1 Nov. 21, 2019

(51) Int. Cl.
*G06F 17/28* (2006.01)

(52) U.S. Cl.
CPC ...... *G06F 17/2854* (2013.01); *G06F 17/2836* (2013.01)

(58) Field of Classification Search
CPC .................. G06F 17/2836; G06F 17/2854
USPC .................. 704/2–4; 345/173, 420
See application file for complete search history.

(56) References Cited

U.S. PATENT DOCUMENTS

| 8,494,835 | B2 | 7/2013 | Seo et al. |
| 8,626,486 | B2 * | 1/2014 | Och ...................... G06F 17/28 704/3 |
| 9,336,207 | B2 | 5/2016 | Martinez Corria et al. |
| 9,535,905 | B2 | 1/2017 | Martinez Corria et al. |
| 9,558,182 | B1 | 1/2017 | Chenon et al. |
| 2002/0111789 | A1 * | 8/2002 | Hull ................. G06F 17/2795 704/4 |
| 2009/0326913 | A1 | 12/2009 | Simard et al. |
| 2011/0193797 | A1 * | 8/2011 | Unruh .................. G06F 3/0237 345/173 |

OTHER PUBLICATIONS

Trusted Translations, "Post Editing of Machine Translation," <http://www.trustedtranslations.com/translation-services/post-editing.asp> [Accessed Online May 16, 2018, 2 pages.
Moravia, Global Blog, Posted by Lee Densmer, Aug. 19, 2014 "Light and Full MT Post-Editing Explained," <http://info.moravia.com/blog/bid/353532/Light-and-Full-MT-Post-Editing-Explained> [Accessed Online May 16, 2018].

* cited by examiner

*Primary Examiner* — Md S Elahee
(74) *Attorney, Agent, or Firm* — Patterson + Sheridan, LLP

(57) ABSTRACT

Improved translation operations are disclosed. A first segment of text in a first language is received, to be translated into a second language. The first segment is evaluated, by operation of one or more processors, of text using the pattern model to generate a first s-score. A second segment of text in the second language is generated based on processing the first segment of text using a machine translation model. Upon determining that the first s-score exceeds a predefined threshold, the first segment of text is flagged for auto-substitution with the second segment of text, such that the first segment of text is not reviewed by a human editor.

20 Claims, 13 Drawing Sheets

US 10,599,782 B2

ANALYTICAL OPTIMIZATION OF TRANSLATION AND POST EDITING

BACKGROUND

The present disclosure relates to translation supply chains, and more specifically, to analytical methods of identifying segments that do not require further review during translation processes.

Translation workflows can be used to provide high quality fluent language translations. In some workflows, source text is processed by a series of components, which may be located on a single device or across multiple devices. A translation supply chain (TSC) typically involves a series of operations beginning with a text in a source language, and ending with a translated text in a target language. Often, TSCs utilize a combination of machine translations and human editing. In many TSCs, source text is delineated into segments which are translated individually. These translations may be based on a repository of previous translations, via a machine translation model, or a combination of both. In existing systems, human editors must then review many or all of these segments in order to verify their accuracy, and correct any translation errors manually. This post-edit process is time consuming and expensive, but is required by existing systems to ensure a high quality translation.

SUMMARY

According to one embodiment of the present disclosure, a method for processing text in an optimized translation workflow is provided. The method includes receiving a first segment of text in a first language to be translated into a second language. The first segment of text is evaluated using a pattern model to generate a first s-score, by operation of one or more processors. Additionally, a second segment of text in the second language is generated based on processing the first segment of text using a machine translation model. Upon determining that the first s-score exceeds a predefined threshold, the method includes flagging the first segment of text for auto-substitution with the second segment of text, such that the first segment of text is not reviewed by a human editor.

According to a second embodiment of the present disclosure, a system including one or more computer processors and a memory containing a program is provided. The program, when executed by the one or more computer processors performs an operation for processing text in an optimized translation workflow. The operation includes receiving a first segment of text in a first language to be translated into a second language. The first segment of text is evaluated using a pattern model to generate a first s-score. Additionally, a second segment of text in the second language is generated based on processing the first segment of text using a machine translation model. Upon determining that the first s-score exceeds a predefined threshold, the operation includes flagging the first segment of text for auto-substitution with the second segment of text, such that the first segment of text is not reviewed by a human editor.

According to one embodiment of the present disclosure, a computer program product is provided. The computer program product includes a computer-readable storage medium having computer-readable program code embodied therewith, the computer-readable program code executable by one or more computer processors to perform an operation for processing text in an optimized translation workflow. The operation includes receiving a first segment of text in a first language to be translated into a second language. The first segment of text is evaluated using a pattern model to generate a first s-score. Additionally, a second segment of text in the second language is generated based on processing the first segment of text using a machine translation model. Upon determining that the first s-score exceeds a predefined threshold, the operation includes flagging the first segment of text for auto-substitution with the second segment of text, such that the first segment of text is not reviewed by a human editor.

DETAILED DESCRIPTION

Figure 1:
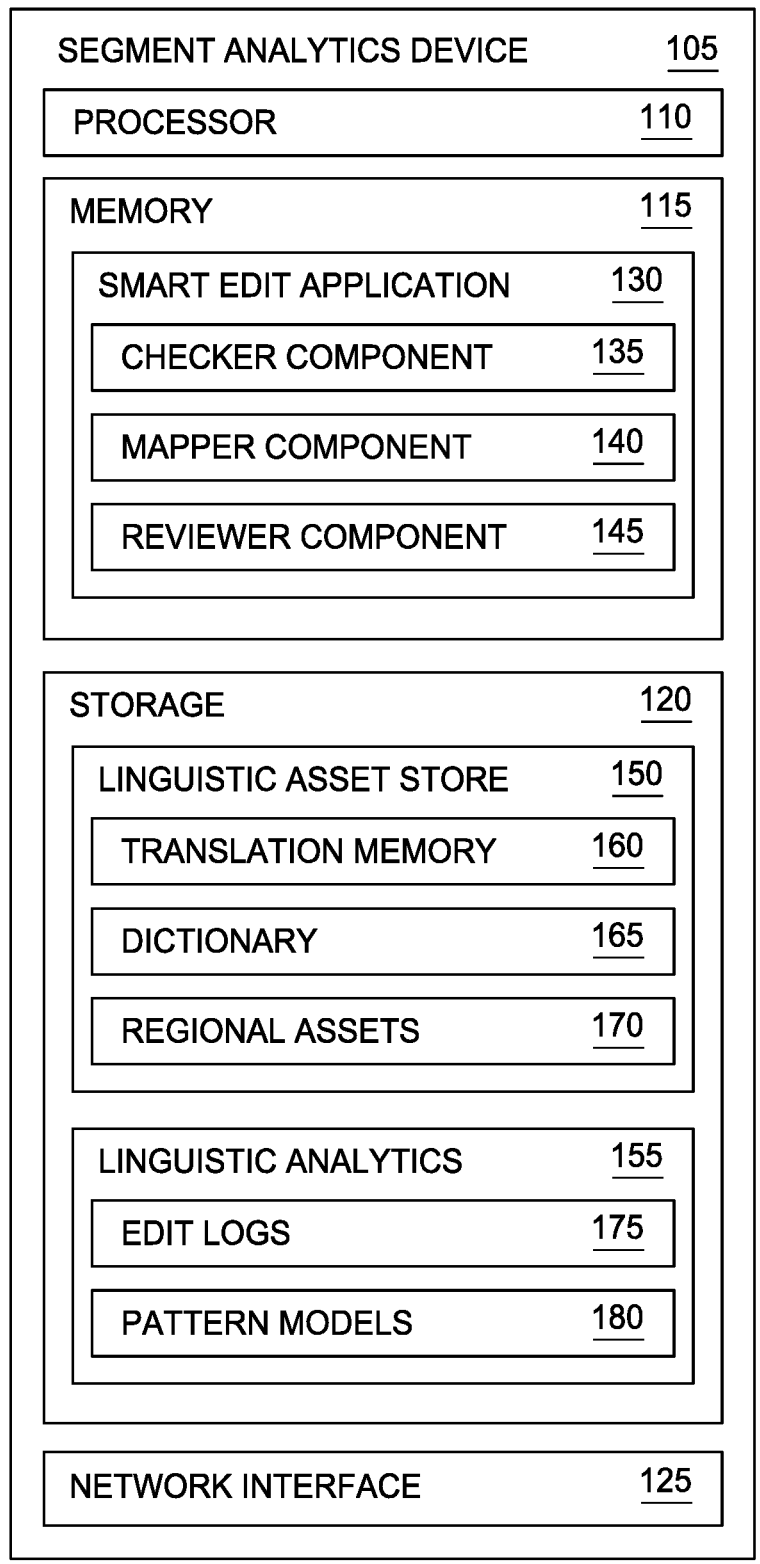
FIG. 1 is a block diagram illustrating a segment analytics device, according to one embodiment of the present disclosure.

In embodiments of the present disclosure, text in a source language may be provided to a TSC (e.g., by a client) for translation into one or more target languages. For example, a client may provide technical specifications or instructions to be translated to any number of languages. In an embodiment, the source text is split into a number of segments based on a variety of factors, such as linguistic markers, punctuation, grammar, and other methodologies. These segments may be of any length. In embodiments, the "size" of a segment is an integer referring to its length (e.g., by number of words) while the "scope" of a segment is a classification based on the size (e.g., small, medium or large). In one embodiment, a segment that is four words or fewer is "small" scope, "medium" scope refers to segments between five and fourteen words, and segments fifteen words or longer are "large" scope. Of course, in various embodiments, these delineations may differ based on the particular implementation. Additionally, in some embodiments, there may be any number of scopes, in addition to or instead of the three discussed above. As used herein, the "scope" refers to the scope of the source segment in the original language, as opposed to the scope or size of the subsequent translation. Further, references to a "segment" are intended as references to a source segment, unless otherwise indicated.

In embodiments of the present disclosure, segments may be compared against a repository of prior translations in order to determine whether a match exists. For example, if a particular segment is found in the repository, the corresponding translation can be utilized to help reduce or eliminate further downstream processing of the segment. In some embodiments, segments are processed to determine a "match type" for each segment, which refers to how closely the segment matches an entry in the repository. In one embodiment, one such match type is an "automatic," "auto substitution," or "auto exact" match type. An AutoSub match indicates that the exact segment is found in the repository, with identical context. For example, the context is identical if the source and destination languages are identical, the domain matches, the project and document ID match, and the like. In one embodiment, segments with an AutoSub match may be flagged as not requiring any further downstream editing, because a human has already reviewed the translation in the repository. In some embodiments, AutoSub matches may still receive some level of proofreading, but the intensive and expensive post edit may be bypassed.

In one embodiment, a second match type may be an "exact" match. An exact match may be identified for a segment where the segment's content is found in the repository (i.e., the segment exactly matches an entry in the repository), but the context differs. Additionally, in one embodiment, a segment may have a "fuzzy" match. A fuzzy match may refer to a segment which is close to or is related to a segment in the repository, but not exactly matched. For example, in one embodiment, the segment "hard drive" may be considered to be a fuzzy match for "HDD," "database," and other related words. Similarly, in an embodiment, a segment that includes "the fox jumped over the fence" may be a fuzzy match with a segment that includes "the fox leaped over the fence," "the fox jumps over the fence," "the dog is jumping over the fence," and the like. In some embodiments, in addition to providing match types, the system may also provide a confidence measure indicating how close the match is.

In one embodiment, if no match is found in the repository (either auto-exact, exact, or fuzzy), the segment may be processed with a machine translation model, which may be trained and refined using machine learning (e.g., using final translations after a human has reviewed the segments during post edit). In an embodiment, after being processed by the machine translation model, the segment is marked as having a "machine" or "machine translation" match type. In some embodiments, segments may be organized based on the class they belong to. In an embodiment, the segment class refers to the scope and match type of the segment. For example, a first class may be "small" scope and "machine translation" match, while a second class includes "medium" scope and "exact" match segments, and so forth. Of course, any combination of scope and match type may constitute a class. In some embodiments, once a segment has been processed, it is provided to a human for post edit in order to verify its accuracy. Embodiments of the present disclosure enable the analysis of segments based in part on their class in order to identify segments that need not be subjected to further review, or require only a reduced level of review, and can therefore bypass this downstream post edit process.

FIG. 1 is a block diagram illustrating a Segment Analytics Device 105, according to one embodiment of the present disclosure. As illustrated, the Segment Analytics Device 105 includes a Processor 110, a Memory 115, Storage 120, and a Network Interface 125. In the illustrated embodiment, Processor 110 retrieves and executes programming instructions stored in Memory 115 as well as stores and retrieves application data residing in Storage 120. Processor 110 is representative of a single CPU, multiple CPUs, a single CPU having multiple processing cores, and the like. Memory 115 is generally included to be representative of a random access memory. Storage 120 may be a disk drive or flash-based storage device, and may include fixed and/or removable storage devices, such as fixed disk drives, removable memory cards, or optical storage, network attached storage (NAS), or storage area-network (SAN). In the illustrated embodiment, the Segment Analytics Device 105 may be communicatively coupled with other devices through the Network Interface 125.

Although illustrated as a single device, in some embodiments, the Segment Analytics Device 105 may be implemented as components on various distinct computing devices, in various physical or geographic locations. As illustrated, the Memory 115 includes a Smart Edit Application 130, which includes a Checker Component 135, a Mapper Component 140, and a Reviewer Component 145. In the illustrated embodiment, the Storage 120 includes a Linguistic Asset Store 150 and Linguistic Analytics 155. Although illustrated as residing in Storage 120 on the Segment Analytics Device 105, in various embodiments, one or both of the Linguistic Asset Store 150 and Linguistic Analytics may reside on one or more other devices, such as a remote database system or a cloud storage environment. As illustrated, the Linguistic Asset Store 120 includes a Translation Memory 160, a Dictionary 165, and Regional Assets 170. Although a single Translation Memory 160 and Dictionary 165 are shown for illustrative purposes, in embodiments, there may be any number of these components.

In an embodiment, the Translation Memory 160 includes a repository of prior translations that may be useful for current translation efforts. For example, as discussed above, the Translation Memory 160 may include a number of source segments and the corresponding final translations. In some embodiments, the Translation Memory 160 may be domain-specific. For example, translations associated with a healthcare domain may be maintained in a separate Translation Memory 160 than translations relating to law or technology. In some embodiments each domain is stored within a single Translation Memory 160, along with data or metadata indicating the domain to which each entry belongs. Additionally, in some embodiments, the Translation Memory 160 is language-specific with respect to the source language, the target language, or both. For example, in one embodiment, a first Translation Memory 160 may include translations from English to French, while a second Translation Memory 160 includes translations from English to Spanish. In some embodiments, however, each source/destination language pair may be included in one or more Translation Memories 160, with accompanying data to indicate the source and target languages. Additionally, in some embodiments, the Translation Memory 160 may be distributed across multiple computing systems. In an embodiment, the Translation Memory 160 includes records of a large number of prior translations, including records that are unrelated to the current translation effort.

In some embodiments, each entry in the Translation Memory 160 also includes an indication of the context of the historical segment. For example, the entry may include information about the project or document the segment originated in, an indication of one or more surrounding segments, and the like. In one embodiment, each entry in the Translation Memory 160 may include other linguistic markers that indicate syntax, punctuation, linguistic analysis, and the like. In the illustrated embodiment, the Dictionary 165 includes predefined translations for individual words or small phrases or terms. In some embodiments, there may be multiple Dictionaries 165, each domain-specific. In some embodiments, the presence of a refined and domain-specific Dictionary 165 may help facilitate high quality translations without the need for additional processing by a machine translation model, and without further review by human editors. In an embodiment, the Regional Assets 170 correspond to one or more corpuses that are specialized in a particular language, dialect, culture, and domain of particular geographic regions. In embodiments, the use of Regional Assets 170 may improve translations targeted towards or originating from regions represented by the Regional Assets 170. In some embodiments, the Dictionary 165 and Regional Assets 170 may be distributed across multiple devices.

As illustrated, the Linguistic Analytics 155 includes Edit Logs 175 and Pattern Models 180. In an embodiment, the Edit Logs 175 include data about segments which have been previously translated. For example, in an embodiment, each Edit Log 175 may include the source segment, the initial translation provided by the system, and the final translation accepted by a human reviewer. In one embodiment, each Edit Log 175 may also include an indication of the associated domain and languages. In some embodiments, each Edit Log 175 also includes the context of the segment, such as the surrounding segments. Similarly, in an embodiment, each Edit Log 175 includes an indication as to the machine translation model that was used (if any) to generate the translation. In some embodiments, each Edit Log 175 includes an indication as to how long the human editor spent reviewing or revising the translation. In one embodiment, each Edit Log 175 may also include other linguistic markers that indicate syntax, punctuation, linguistic analysis, and the like. Similarly to the Translation Memory 160, in an embodiment, the Edit Logs 175 include data about prior translations which are unrelated to the current translation efforts.

In the illustrated embodiment, the Pattern Models 180 are generated based on the Edit Logs 175, and are generally used to identify excellent matches, such that no further processing or review is required (or such that reduced review is needed). In some embodiments, each Pattern Model 180 may correspond to a particular domain and language pair. In some embodiments, there may be multiple Pattern Models 180 within a domain and language pair. For example, if multiple machine translation models are available, or multiple Translation Memories 160 or Dictionaries 165 can be used, a different Pattern Model 180 may be generated corresponding to each of these options. In various embodiments, the Pattern Models 180 may be rules-based, or may be generated based on analytical modeling techniques, as will be discussed in more detail below.

In one embodiment, the Checker Component 135 is invoked prior to machine translation to perform size analysis on source segments based on the Pattern Models 180. For example, in one embodiment, the Checker Component 135 is utilized after the source segments have been processed to identify matches in the Translation Memory 160. The Checker Component 135 may analyze these segments, along with any linguistic markers that have been included, in order to identify excellent matches, as will be discussed in more detail below. In one embodiment, the Checker Component 135 focuses on specific small segments (e.g., one to two words in length) where the terminology is well-defined for the particular domain. In such an embodiment, the Pattern Model 180 may define rules for translating small segments based on the associated domain Dictionary 165. In some embodiments, the Checker Component 135 only reviews segments which have no match (i.e., a match type of "no match") that may be processed via the machine translation model(s) to generate a machine match.

In an embodiment, the Mapper Component 140 generates the Pattern Models 180. For example, for a given domain, the Mapper Component 140 may retrieve Edit Logs 175 corresponding to the domain and associated with a particular machine translation model. In some embodiments, the Mapper Component 140 may then build a map table containing metadata for assessing quality across all segments having machine translation matches. For example, in one embodiment, each row in the map table may include the machine translation match, the final translation, the scope of the source segment, an edit score of the segment/Edit Log 175, and other linguistic markers. In an embodiment, the edit score is defined based in part on the edit distance (e.g., the Levenshtein distance) between the machine translation and the final translation, as well as the determined linguistic noise associated with the segment, as will be discussed in more detail below. In an embodiment, each Pattern Model 180 is used to generate s-scores for source segments of text. As used herein, an s-score refers to the suitability of the corresponding segment for automated translation, such that no human review is required (or reduced review is required). That is, in an embodiment, the s-score is used to determine whether the segment can be automatically translated with a Dictionary 165 or machine translation model, without the need for full post-edit review.

The Mapper Component 140 may then utilize the map table to generate a Pattern Model 180. In one embodiment, the Pattern Models 180 may include a rules-based table. For example, in one embodiment, the Pattern Models 180 may determine an s-score for a new segment based on identifying a row in the Pattern Model 180 table matching the associated domain, machine translation model, size of the segment, scope of the segment, aggregate edit score of segments with the same scope, and the like. In some embodiments, the Mapper Component 140 may generate predictive models for the Pattern Models 180 by applying analytical modeling techniques against the map table. In some embodiments, a portion of the Edit Logs 175 may be set aside as validation data while the remaining are used as training data. In various embodiments, a number of modeling algorithms may be used, including logistic regression, linear discriminant analysis, k-nearest neighbors, classification and regression trees, Gaussian naïve Bayes, support vector machines, and the like. In some embodiments, multiple models may be created, and the validation data may be used to identify the most accurate model for the particular domain, machine translation model, and scope.

In the illustrated embodiment, the Reviewer Component 145 is utilized to process segments after they have been processed via a machine translation model. Similarly to the Checker Component 135, the Reviewer Component 145 may utilize the Pattern Models 180 to analyze each segment and identify segments that are excellent, and need no further processing (or reduced downstream processing). In some embodiments, the Reviewer Component 145 may apply the same Pattern Model 180 as the Checker Component 135. In other embodiments, the Pattern Models 180 differ based on the stage in the TSC that the segment is in (e.g., before or after machine translation). In some embodiments, the Reviewer Component 145 may utilize a different threshold than the Checker Component 135 when determining which segments should be marked as "excellent" matches. In one embodiment, the Checker Component 135 only applies Pattern Models 180 to segments below a predefined size or scope, while the Reviewer Component 145 applies Pattern Models 180 to additional segments.

Figure 2:
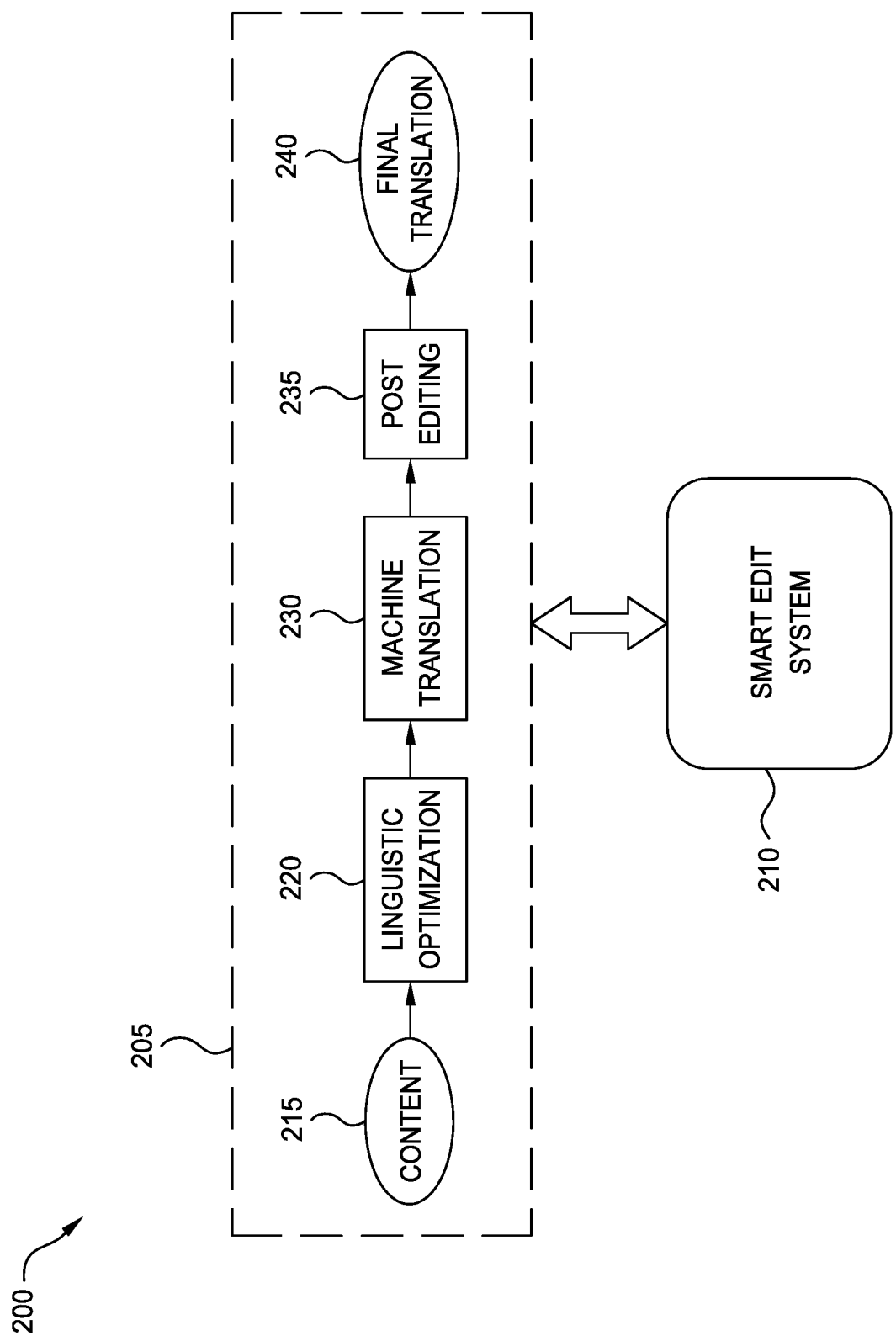
FIG. 2 is a block diagram illustrating a system configured to optimize translation and post editing, according to one embodiment disclosed herein.

FIG. 2 is a block diagram illustrating a system 200 configured to optimize translation and post editing, according to one embodiment disclosed herein. The system 200 includes a TSC 205 with a number of components, and a Smart Edit System 210 that implements embodiments of the present disclosure. For example, the Smart Edit System 210 may include a Checker Component 135, Mapper Component 140, and Reviewer Component 145 for processing segments. As illustrated, the TSC 205 begins with Content 215 provided by a client. This content is in a source language, and is to be translated to one or more target languages. In some embodiments, the Content 215 is processed by a different TSC 205 depending on the source and target languages. In such an embodiment, a single source document may be parsed and processed by multiple TSCs 205, for translation into multiple languages.

As illustrated, Content 215 is transmitted to block 220, where linguistic optimization is undertaken. In an embodiment, linguistic optimization involves dividing the Content 215 into segments, and attempting to find a match in the Translation Memory 160 for each segment. This dividing process may be accomplished based on a variety of factors, such as linguistic markers associated with the Content 215, punctuation, syntax, grammar, and the like. In an embodiment, once the segments have been created, the Translation Memory 160 is searched for previous high-quality translations that match each segment. As discussed above, in an embodiment, these matches may include "auto" matches, "exact" matches, "fuzzy" matches, and "no match." In some embodiments, linguistic markers may be inserted into the segments during linguistic optimization, in order to facilitate downstream processing.

In an embodiment, the "no match" segments are then forwarded to block 230 for machine translation. This component may include one or more machine translation models, which can be trained and refined during use. In some embodiments, each of the segments (including all match types) are then transmitted to block 235 for post editing. In embodiments, some or all of the segments are first processed by a Checker Component 135 prior to being sent to block 230. During post editing, human editors can review and revise the translations provided during linguistic optimization and machine translation, in order to ensure fluent results. In embodiments, some or all of the machine translated segments may be analyzed by the Reviewer Component 145 prior to post editing, and some segments may be marked as "excellent" in order to bypass post editing. Finally, based on this post-editing process, the Final Translation 240 is generated. As will be discussed below in more detail, the Smart Edit System 210 is integrated at various points into the TSC 205 to improve this process.

Figure 3:
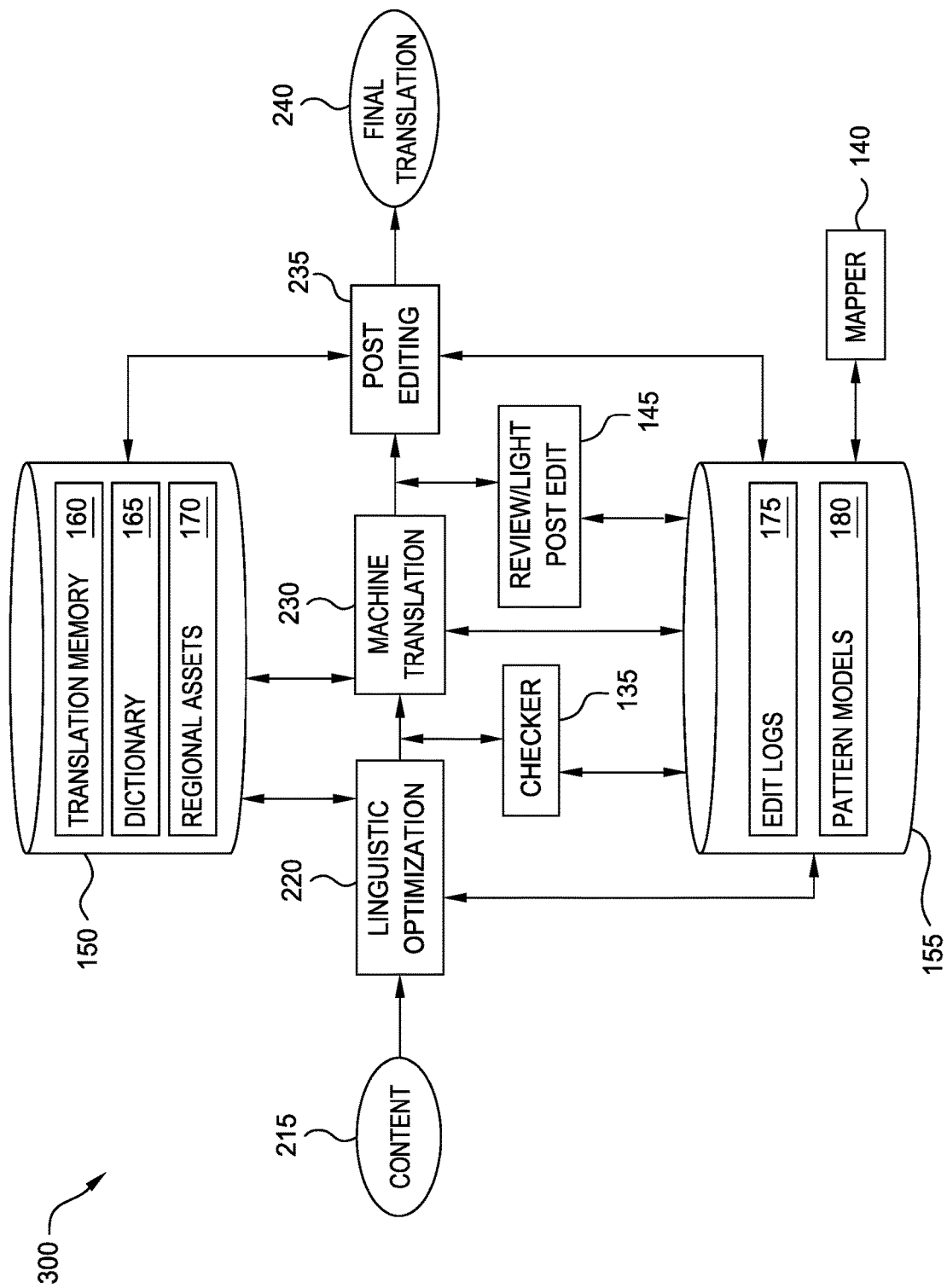
FIG. 3 is a block diagram illustrating additional details of a system configured to optimize translation and post editing procedures, according to one embodiment of the present disclosure.

FIG. 3 is a block diagram illustrating additional details of a system 300 configured to optimize translation and post editing procedures, according to one embodiment of the present disclosure. As illustrated, the process again begins with Content 215 received from a client. This Content 215 is passed to block 220 for Linguistic Optimization. As discussed above, this may include dividing the Content 215 into a plurality of segments, and searching the Translation Memory 160 for matches to each segment. After completion of linguistic optimization, the segments proceed to the Checker Component 135. As discussed above, in an embodiment, the Checker Component 135 processes each segment with one or more Pattern Models 180 to generate excellent scores. In addition to the above match types, embodiments of the present disclosure introduce the concept of "excellent" matches. In some embodiments, the s-scores are a binary result indicating whether the segment is eligible for an "excellent" match or not. In some embodiments, the s-score is a number within a range (e.g., from zero to one). In such an embodiment, the Checker Component 135 may compare the s-score to a predefined threshold to determine whether the segment should be converted to an excellent match type. In some embodiments, the Checker 135 may also insert one or more linguistic markers in the segments in order to facilitate downstream processing. In some embodiments, the Checker 135 may modify the segments (e.g., by substituting words, rearranging words, and the like) based on the Pattern Models 180, in order to facilitate machine translation.

After processing by the Checker 135, the "no-match" segments are processed using one or more machine translation models, as illustrated in block 230, to create an initial translation for each segment that does not already have a match (or have not been marked as "excellent" by the Checker 135). Next, the Reviewer Component 145 analyzes each segment using the Pattern Models 180 to identify excellent matches. In some embodiments, different Pattern Models 180 than the ones used by the Checker 135 may be utilized to make this determination. In some embodiments, a different predefined threshold is used at this stage. In one embodiment, segments with match type "excellent" then bypass the post editing block at 235, and proceed straight to proofreading, or to the Final Translation 240 with no additional downstream processing. In some embodiments, excellent matches are forwarded to a "light" post edit process for a brief review. In one embodiment, this light post-edit process may be performed by a human. In other embodiments, the light post edit is an automated process as well. In an embodiment using light post editing, all segments with match type of "excellent" are reviewed to ensure that the translations are sufficiently accurate. If so, no further processing is required and the segment is flagged as "final" or "auto substitution." If not, in one embodiment, the segment is forwarded on for full post editing in block 235.

During the post editing block 235, a skilled human reviewer must analyze each of the segments other than "auto exact" matches, to ensure quality translation. This post-edit is significantly more skill and resource intensive than light post editing, and the cost per segment is significantly higher. During post editing, the human reviewer can either accept the proposed translation (e.g., a match from the Translation Memory 160 or a machine translation), modify the translation, or reject it and create a new translation. In embodiments disclosed herein, the segments marked as "excellent" based on the Pattern Model 180 may bypass this post edit process, thereby reducing resource requirements and improving the efficiency of the TSC. Additionally, as illustrated, the Mapper Component 140 interacts with the Linguistic Analytics 155 to retrieve Edit Logs 175 and generate Pattern Models 180. Although not illustrated, in some embodiments, the segments are transferred between each component by storing them in a centralized location. For example, in one embodiment, the Content 215 is initially stored in the Linguistic Asset Store 150, until it is retrieved for linguistic optimization. After the segments have been created and matches identified, each segment may then be stored back in the Linguistic Asset Store 150, where the Checker Component 135 retrieves them. Any excellent matches may be flagged or marked as "excellent," and then returned to the Linguistic Asset Store 150. In this way, each component can access the segments for processing.

In some embodiments, the Final Translations 240 are also used in several ways, in addition to being sent to the client. For example, in one embodiment, the Final Translations 240 are transmitted to the Linguistic Asset Store 150 for inclusion in the Translation Memory 160. In some embodiments, the Final Translations 240 are also transmitted to the Linguistic Analytics 155 for inclusion in the Edit Logs 175. In some embodiments, the actual edits and changes made by the human reviewer during post edit are also included within the Edit Logs 175. In one embodiment, the length of time that the human reviewer spent on the segment is included within the Edit Log 175. Additionally, in some embodiments, the results of the post editing process are used to refine the machine translation models and/or the linguistic optimization process. In this way, the system 300 can learn and gain increased maturity during use.

Figure 4:
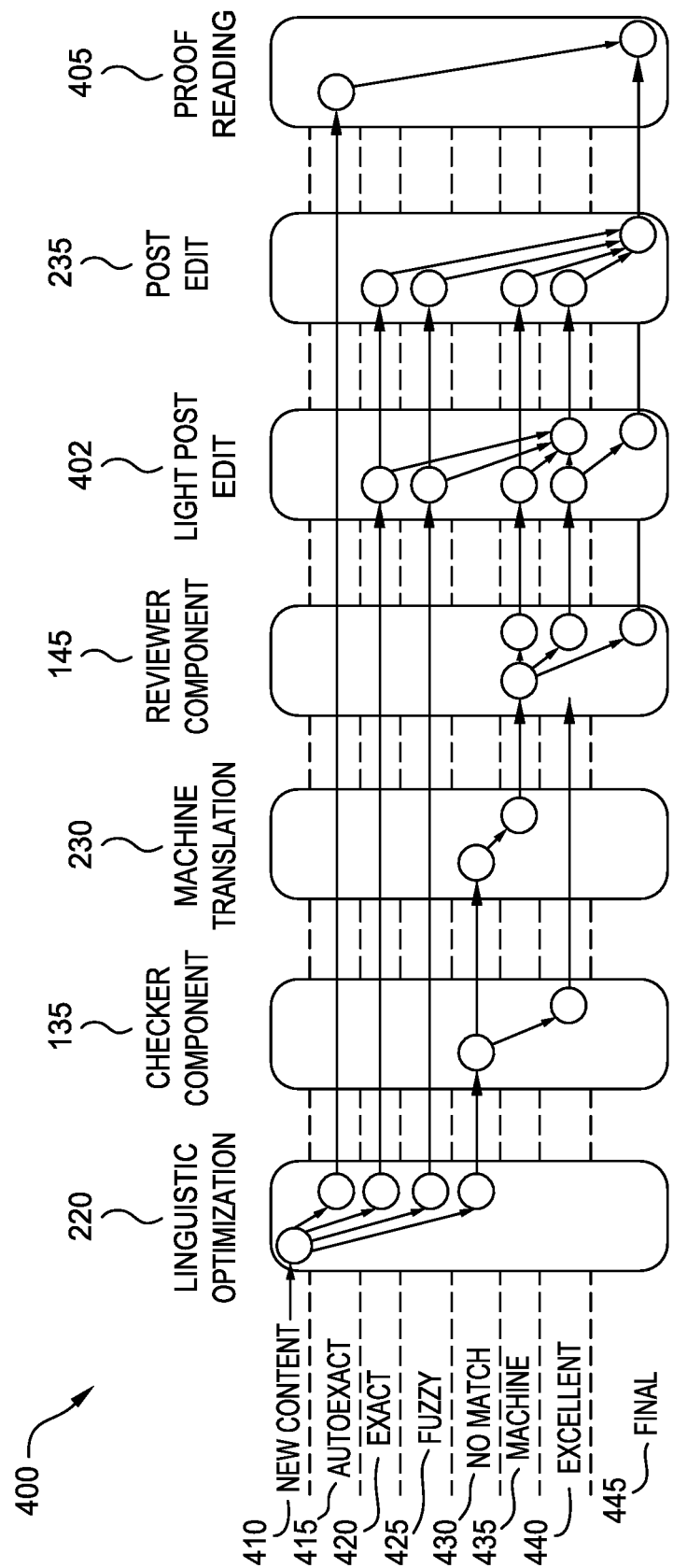
FIG. 4 is a block diagram illustrating how segments are processed by components of an optimized translation supply chain, according to one embodiment disclosed herein.

FIG. 4 is a block diagram illustrating how segments are processed by components of an optimized TSC 400, according to one embodiment disclosed herein. In the illustrated embodiment, segments, represented by circles, pass from one component or process to the next. During this processing, the segments can move between match types (i.e., components may change the match type of the segment, or associate the segment with a new flag or marker indicating the new match type). In the illustrated embodiment, each match type is included in a row, and each component or process is included as a column. As illustrated, all segments begin as New Content 410. In block 220, linguistic optimization is performed to determine a match type for each segment. As illustrated, each segment may be matched as AutoExact 415, Exact 420, Fuzzy 425, or No Match 430. In an embodiment, each "No Match" segment is then processed by the Checker Component 135. In some embodiments, the Checker Component 135 may also analyze Exact 420 and Fuzzy 425 matches. As illustrated, the Checker Component 135 may move some of the segments to match type Excellent 440, while the remaining segments continue on for Machine Translation 230. Although not depicted, in some embodiments, the Checker Component 135 may also identify segments that can be changed to AutoExact 415, or Final 445. For example, in one embodiment, if processing the segment with the Pattern Model 180 produces an s-score higher than a first threshold, the Checker Component 135 may assign the segment an Excellent 440 match. In some embodiments, if the s-score exceeds a second threshold, the segment may be transitioned to an AutoExact match 415, which will be accepted without further review. In some embodiments, match type "excellent" is functionally equivalent to an "AutoExact" match type, in terms of the downstream processing that is performed.

During Machine Translation 230, the segments of match type No Match 430 are processed with one or more machine translation models, and converted into Machine matches 435. Next, the Reviewer Component 145 reviews the segments with match type of Machine 435. Depending on the specific Pattern Model 180, these may either remain Machine 435, be changed to Excellent 440, or be changed to AutoExact 415 or Final 445. Although not illustrated, in some embodiments, the Reviewer Component 145 may similarly process Exact 420 and Fuzzy 425 segments as well. In the illustrated embodiment, the segments proceed to a Light Post Edit 402. As illustrated, during Light Post Edit 402, segments may be left with the same match type, or may be flagged as "Excellent," "Final," or "AutoExact" in various embodiments. In one embodiment, Light Post Edit 402 involves a brief scan (which may be automated or human) for major errors or issues, without concern for minor issues. In another embodiment, Light Post Edit 402 involves searching for specific patterns, such as markup tags indicating text formatting, to ensure that these formatting issues are corrected. In one embodiment, Light Post Edit 402 simply involves identifying and marking faults or issues, without spending time to correct them. Additionally, in some embodiments, Light Post Edit 402 is not used, and segments marked as "excellent" matches may bypass all downstream processing, while matches that are neither "excellent" nor "auto-exact" are subject to post-editing.

At block 235, post editing is completed. As discussed above, during post edit, the translations are finalized such that all segments are moved to match type of Final 445. In the illustrated embodiment, some Excellent matches 440 are also processed in post edit. In some embodiments, however, segments with match type Excellent 440 are not sent to post edit at all, and proceed straight to proofreading or to final. Finally, in block 405, a final proofreading is completed. In some embodiments, however, post edit is the final block. As illustrated, the Checker Component 135 and Reviewer Component 145 can identify Excellent 440 match types, which can be flagged for reduced downstream processing or for no downstream processing at all. This significantly reduces the costs involved in the TSC 400.

In embodiments of the present disclosure, the segments are processed based in part on their size, scope, and match type. Additionally, in an embodiment, the Pattern Models 180 are generated based in part on edit scores for each Edit Log 175. In one embodiment, each edit score is determined based at least in part on a linguistic noise of the corresponding segment, as will be discussed in more detail below. Further, in some embodiments, in order to determine the linguistic noise of a segment, a linguistic vector for the corresponding segment must first be generated, as will be discussed in more detail below. Additionally, in some embodiments, the maturity of each machine translation model is tracked over time based at least in part on the linguistic noise and linguistic vectors, as will be discussed in more detail below.

Figure 5:
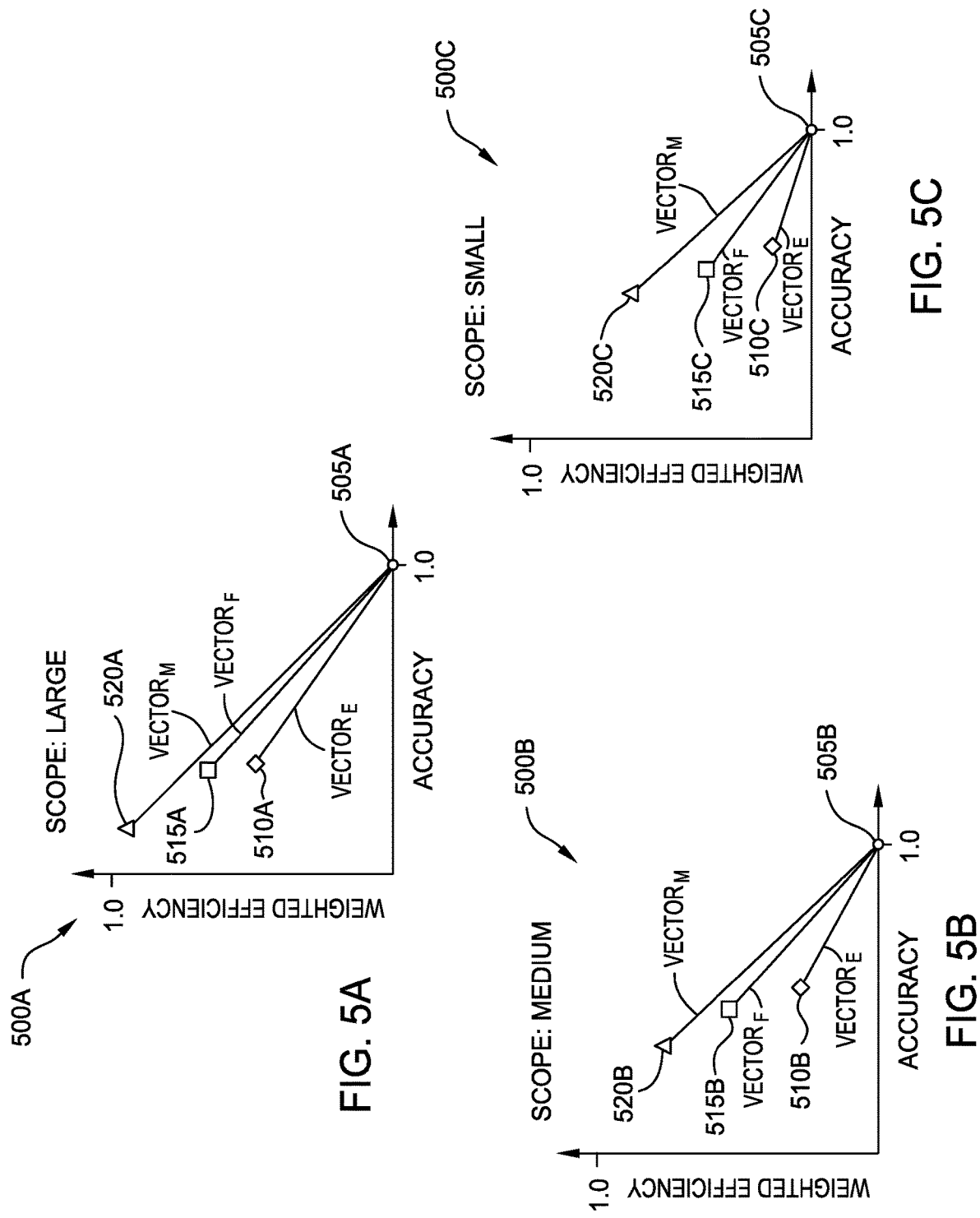
FIGS. 5A through 5C are block diagrams illustrating linguistic vectors, according to one embodiment of the present disclosure.

FIGS. 5A through 5C are block diagrams illustrating linguistic vectors, according to one embodiment of the present disclosure. Each of FIGS. 5A through 5C corresponds to a particular scope. As illustrated, FIG. 5A includes a Graph 500A of Linguistic Vectors 510A, 515A, and 520A corresponding to a scope of "large." Similarly, FIG. 5B includes a Graph 500B of Linguistic Vectors 510B, 515B, and 520B corresponding to a scope of "medium," and FIG.

5C includes a Graph 500C of Linguistic Vectors 510C, 515C, and 520C corresponding to a scope of "small." In embodiments of the present disclosure, each new source segment is processed based at least in part on its scope, because the accuracy of the matches or machine translations tends to vary based in part on the scope of the segment. As will be explained in more detail, in embodiments of the present disclosure, maturity of the system tends to increase more rapidly and maintain higher levels of maturity with respect to smaller segments, which allows for improved translation with reduced human effort and therefore reduced costs and time requirements.

In the illustrated graphs 500A-C, a linguistic coordinate has been generated and graphed on a 2-dimensional coordinate plane for each class of segments. For example, each diamond shape 510A-C represents a linguistic coordinate for segments with match type "exact," while the squares 515A-C represent "fuzzy" matches and the triangles 520A-C represent machine translations. Further, as illustrated, each Graph 500A-C includes a theoretical "perfect point" at (1.0, 0), as will be explained further below. Additionally, as illustrated, each linguistic coordinate 510A-C, 515A-C, and 520A-C has a corresponding linguistic vector, which represents a measurement of linguistic noise across the relevant dimensions. Although FIGS. 5A through 5C illustrate two-dimensional points (i.e., weighted efficiency and accuracy) for simplicity, in embodiments each linguistic coordinate may include additional dimensions. For example, in one embodiment, each linguistic coordinate may include dimensions for weighted efficiency, accuracy, match type, scope, segment size, and the like.

In the illustrated embodiment, each linguistic coordinate 510A-C, 515A-C, and 520A-C is based on the weighted efficiency and accuracy of the corresponding class of segments. In an embodiment, the linguistic coordinates are generated based on the Edit Logs 175. In this way, the linguistic vector for each class of segments may be determined based on a large number of entries, which may be unrelated to the current translations. The accuracy of a class of segments refers to the percentage of segments in the class that are accepted without change during post edit. For example, in an embodiment, the Mapper Component 140 may retrieve and parse Edit Logs 175 to determine, for each Edit Log 175, the class of the segment (i.e., the scope and match type), and whether the proposed translation was accepted without change, or modified/rejected. Subsequently, the Mapper Component 140 can compute the accuracy (also referred to as post edit leverage) for each class of segments. Generally, a higher accuracy or leverage indicates a more mature system, and reduced effort and costs.

As illustrated, the linguistic coordinates 510A-C, 515A-C, and 520A-C are also based on the weighted efficiency (also referred to as post edit factor) of each class. In an embodiment, the weighted efficiency is a weighted measurement of productivity during the post edit process. In one embodiment, the weighted efficiency is measured in terms of the productivity of a human editor processing segments of the indicated class, weighted by the editor's productivity when processing segments of the same scope, with match type "no match." In one embodiment, the productivity is measured in terms of the number of words per second that the editor processes. For example, suppose, based on the Edit Logs 175, the Mapper Component 140 determines that during the post edit process, segments of scope "small" and match "no match" are reviewed at two words per second. Suppose further that, as reflected in the Edit Logs 175, segments of scope "small" and match type "exact" are processed at an average speed of ten words per second. In such an embodiment, the efficiency of the class "small" and "exact" is ten words per second, and the weighted efficiency is ten words per second weighted by the two words per second for "no match" segments. In one embodiment, this weighted efficiency is given by Formula 1 below, where WeightedEfficiency$_S^M$ is the weighted efficiency of segments with scope "S" and match type "M":

$$WeightedEfficiency_S^M = \frac{Speed_S^{No\ Match}}{Speed_S^M} \quad \text{Formula 1}$$

In Formula 1, Speed$_S^{No\ Match}$ represents the average efficiency of post editors when processing segments of match type "no match" and scope "S" (e.g., two words per second). Similarly, Speed$_S^M$ represents the average efficiency of post edit when reviewing segments with match type "M" and scope "S" (e.g., ten words per second). In an embodiment, each of Speed$_S^{No\ Match}$ and Speed$_S^M$ are determined based on analyzing a plurality of Edit Logs 175. As illustrated in graphs 500A-C, a theoretical perfect match point (indicated by the circles 505A-C) is located at (1.0, 0). That is, the perfect match point indicates a hypothetical segment class that is never rejected during post edit (e.g., accepted 100% of the time) and is processed at a theoretically infinite efficiency (e.g., with no human review at all).

In the illustrated embodiment, the Mapper Component 140 can generate a linguistic vector for each class of segments. In an embodiment, the linguistic vector for a class is based on the distance between the class's linguistic coordinate 510A-C, 515A-C, and 520A-C, and the theoretical perfect point 505A-C for the class, as illustrated in Formula 2, below. In embodiments, because the linguistic vector represents the noise of each class of segments, a smaller linguistic vector indicates a more mature system and better quality translations. As illustrated, in each graph 500A-C (i.e., for each scope), the linguistic vector for exact matches, represented by Vector$_E$, is smaller than the linguistic vector for fuzzy matches (Vector$_F$), while the largest vector represents machine matches (Vector$_M$). Thus, as depicted, exact matches tend to be less noisy than fuzzy matches, while machine translations tend to include the most linguistic noise (other than segments with no match, which of course have a weighted efficiency of 1.0 and an accuracy of zero). As used herein, Class$_S^M$ represents the class of segments with scope "S" and match type "M." In Formula 2, LinguisticVector$_S^M$ represents the linguistic vector for Class$_S^M$. Similarly, LingusticCoordinate$_S^M$ is the linguistic coordinate for Class$_S^M$ and PerfectMatch refers to the linguistic coordinate for the theoretical perfect match point.

$$LinguisticVector_S^M = Distance(LingusticCoordinate_S^M, PerfectMatch) \quad \text{Formula 2}$$

Similarly, as illustrated, the linguistic vectors for each class tends to be smaller as scope decreases. That is, the linguistic vector for point 510A, which represents segments in the class associated with "large" scope and "exact" match (e.g., Class$_{large}^{exact}$) is larger than the corresponding linguistic vector for Class$_{medium}^{exact}$ (from point 510B), which is larger than the linguistic vector for Class$_{small}^{exact}$ (illustrated by point 510C). Thus, as depicted, within each match type, smaller segments tend to have less linguistic noise than larger segments. Further, in embodiments, smaller segments tend to include less linguistic noise per word than larger segments. That is, smaller segments do not simply include less linguistic noise because they include fewer words. Instead, the average noise per word also tends to be lower, as will be discussed in more detail below.

Figure 6:
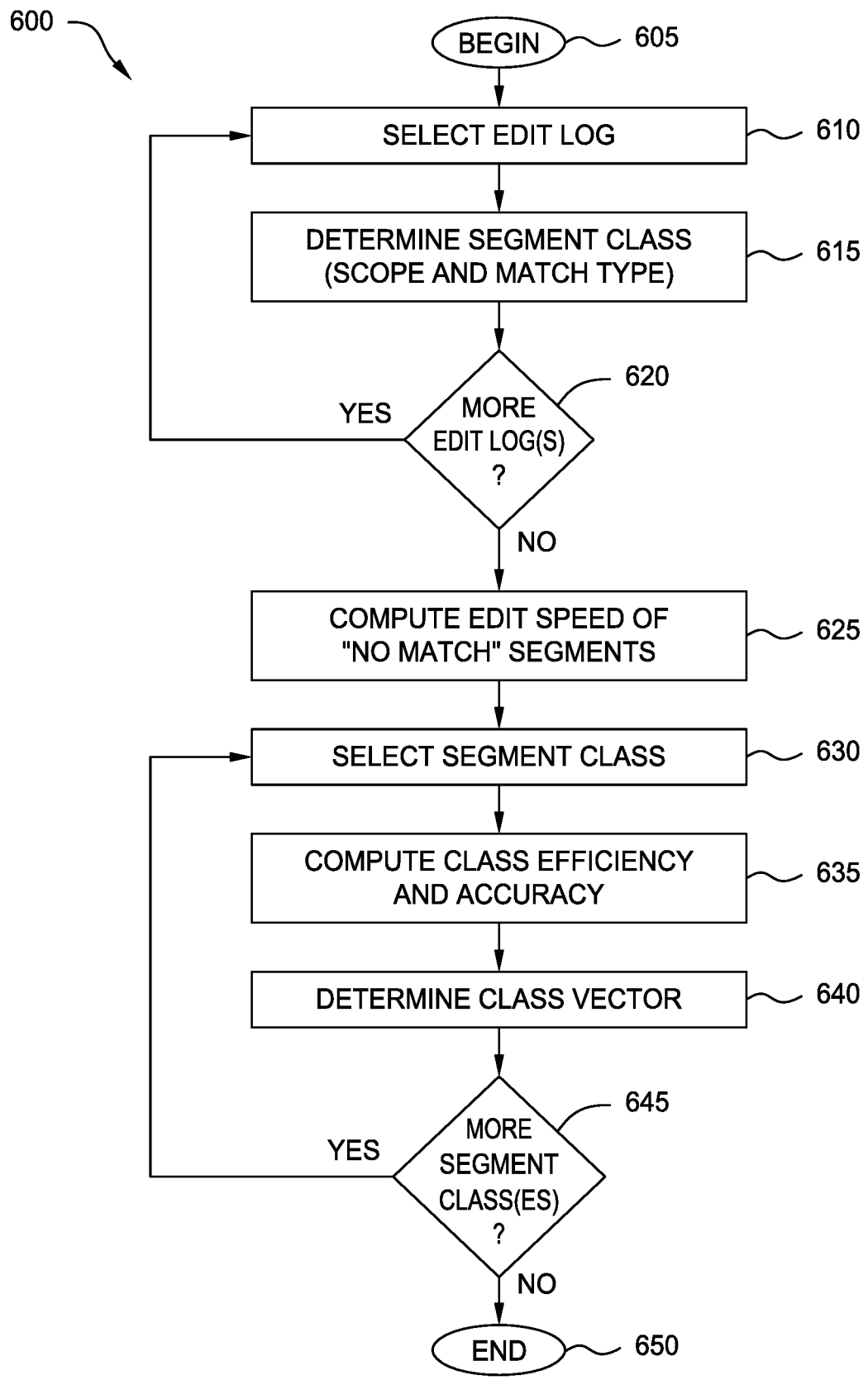
FIG. 6 is a flow diagram illustrating a method of generating linguistic vectors, according to one embodiment of the present disclosure.

FIG. 6 is a flow diagram illustrating a method 600 of generating linguistic vectors, according to one embodiment of the present disclosure. The method 600 begins at block 605. At block 610, the Smart Edit Application 130 (e.g., the Mapper Component 140) selects an Edit Log 175. At block 615, the Mapper Component 140 determines the class of the corresponding source segment, and associates the Edit Log 175 with this class. The method 600 then proceeds to block 620, where it is determined whether there are additional Edit Logs 175 to process. If so, the method 600 returns to block 610. If not, the method 600 continues to block 625. Of course, in some embodiments, each Edit Log 175 may already be associated with the corresponding class (i.e., match type and scope), and blocks 610 through 620 need not be performed. Further, in some embodiments, at block 615, the Mapper Component 140 determines the speed with which the particular segment in the selected Edit Log 175 was reviewed during post edit, and whether the translation was accepted. In some embodiments, this data is already associated with each Edit Log 175.

At block 625, the Mapper Component 140 computes the edit speed for "no-match" segments within each scope. That is, the Mapper Component 140 determines the average speed with which segments with no match and scope "small" ($Class_{small}^{no\ match}$) are processed during post edit, as well as the average speed with which segments in $Class_{medium}^{no\ match}$ are processed and the average speed with which segments in $Class_{large}^{no\ match}$ are processed. In an embodiment, this is accomplished by determining, for each no-match segment, the number of seconds that were spent reviewing the segment divided by the number of words in the segment. These results are then averaged within each scope. In other embodiments, this is accomplished by, for each no-match segment, determining the number of words in the segment divided by the number of seconds spent reviewing the segment. In this way, the baseline efficiency is determined which can be used to weight the efficiency of other match types.

At block 630, the Mapper Component 140 selects a segment class. The method 600 then proceeds to block 635, where the Mapper Component 140 computes class efficiency and accuracy. That is, as discussed above, the Mapper Component 140 may parse each Edit Log 175 associated with the selected class to determine the efficiency or speed for each Edit Log 175 and whether it was accepted. These results can then be aggregated (e.g., averaged) to determine the class efficiency and accuracy. The method 600 then proceeds to block 640, where the Mapper Component 140 determines the class linguistic vector for the selected class. As discussed above, the linguistic vector may be the distance between a class linguistic coordinate (defined based at least in part on the weighted efficiency and accuracy of the class) and a theoretical perfect match point. At block 645, it is determined whether there are additional classes yet to be processed. If so, the method 600 returns to block 630. If not, the method 600 terminates at block 650. In this way, a linguistic vector can be generated for each segment class based on data from historical Edit Logs 175. In some embodiments, linguistic vectors are generated only for Edit Logs 175 associated with a "machine" match, rather than all match types.

Figure 7:
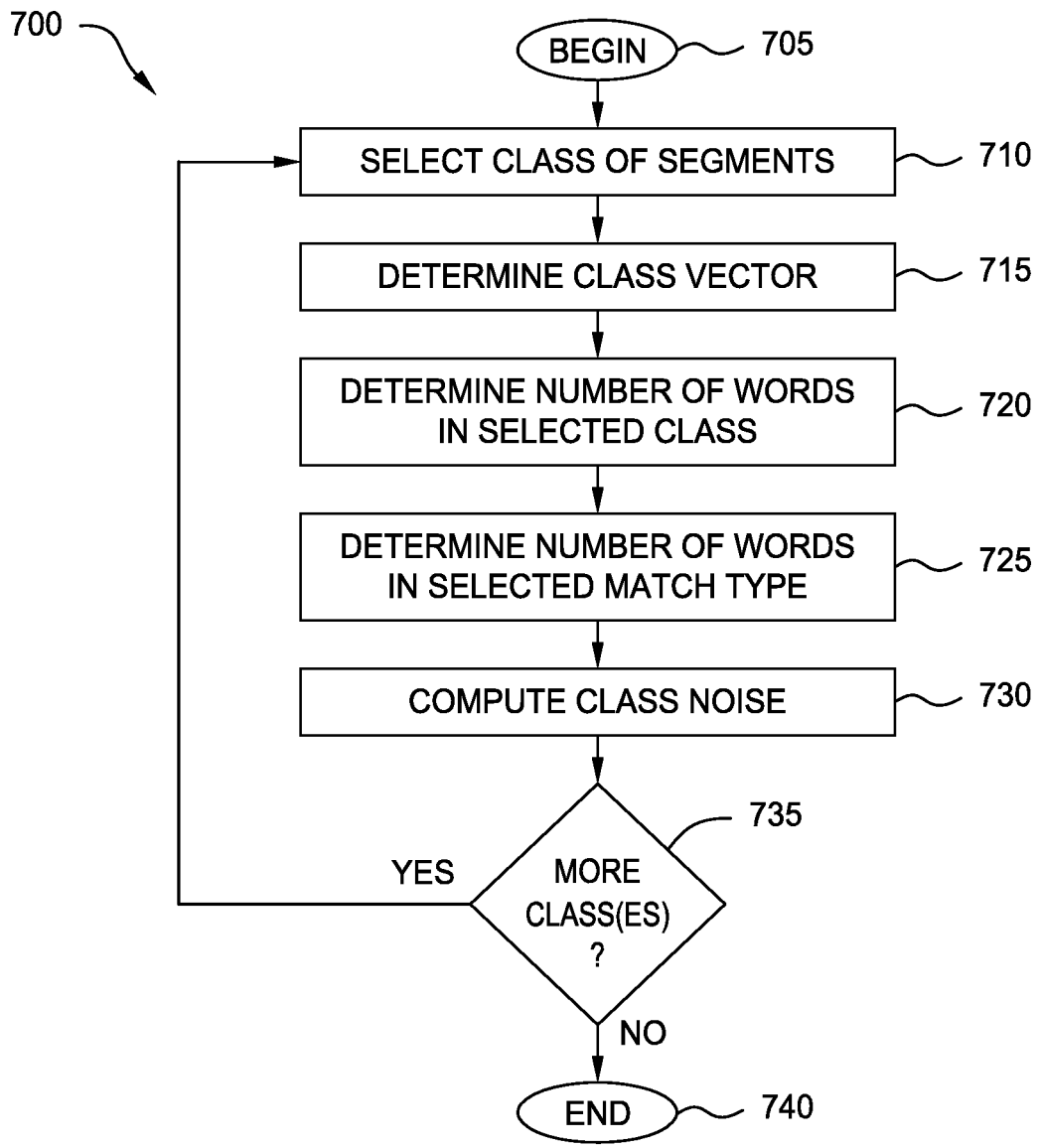
FIG. 7 is a flow diagram illustrating a method of computing linguistic noise of a class of segments, according to one embodiment of the present disclosure.

FIG. 7 is a flow diagram illustrating a method 700 of computing linguistic noise of a class, according to one embodiment of the present disclosure. In embodiments, the linguistic noise of a particular class if based in part on the linguistic vector for the class. The method 700 begins at block 705. At block 710, the Mapper Component 140 selects a class of segments, and at block 715, determines the class vector. This may be accomplished as discussed above in reference to FIGS. 5 and 6. The method 700 then proceeds to block 720, where the Mapper Component 140 determines the number of words that are included within the class set. For example, for a $Class_S^M$, the number of words included within the class may be defined as $Words_S^M$. That is, in an embodiment, $Words_S^M$ is determined by identifying all Edit Logs 175 associated with the $Class_S^M$, and summing the number of words in each corresponding source segment. The method 700 then proceeds to block 725, where the Mapper Component 140 determines the number of words in the match type of the selected class. In an embodiment, this is represented by $Words^M$. That is, $Words^M$ is determined by identifying all Edit Logs 175 associated with a match type "M," and summing the number of words in each corresponding source segment. At block 730, the Mapper Component 140 computes the linguistic noise $LinguisticNoise_S^M$ for the class $Class_S^M$. In an embodiment, this is computed using Formula 3, below:

$$LinguisticNoise_S^M = LinguisticVectors_S^M * \frac{Words_S^M}{Words^M} \quad \text{Formula 3}$$

In some embodiments, rather than utilizing the number of words for the selected match type ($Words^M$), the Mapper Component 140 utilizes the sum of all words across all match types and segments. The method 700 then proceeds to block 735, where the Mapper Component 140 determines whether there are additional classes remaining to be processed (e.g., that do not yet have a calculated linguistic noise). If so, the method 700 returns to block 710. Otherwise, the method 700 terminates at block 740.

Figure 8:
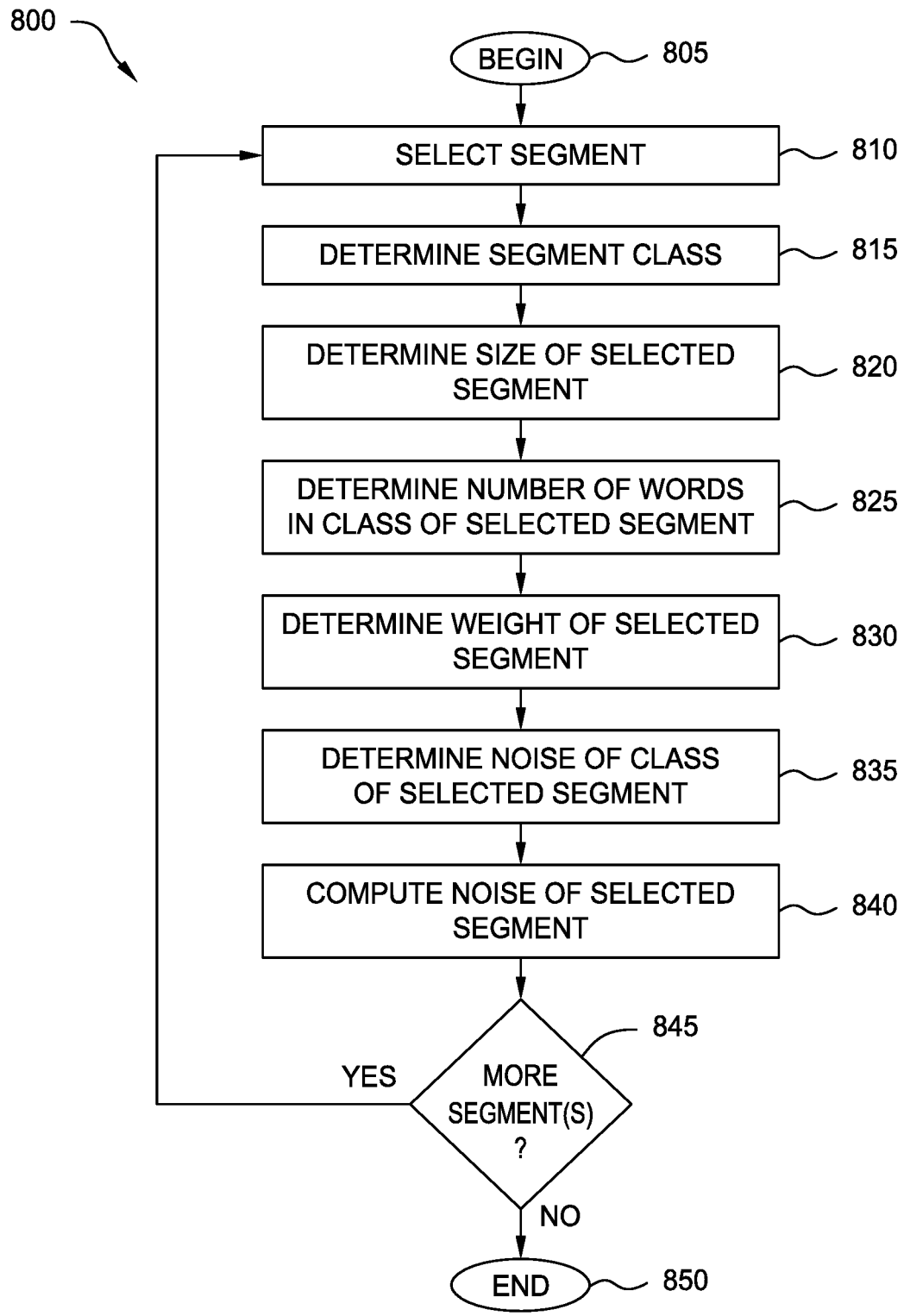
FIG. 8 is a flow diagram illustrating a method of computing linguistic noise of a particular segment, according to one embodiment of the present disclosure.

FIG. 8 is a flow diagram illustrating a method 800 of computing linguistic noise per segment, according to one embodiment of the present disclosure. The method 800 can be implemented to determine the linguistic noise of any particular segment, which is defined as LinguisticNoise(i) for segment i, where segment i is in $Class_S^M$. The method 800 begins at block 805. At block 810, the Mapper Component 140 selects a segment. In some instances, the selected segment may correspond to a source segment in an Edit Log 175. At block 815, the Mapper Component 140 determines the class of the segment. In one embodiment, the Mapper Component 140 does so by determining the size of the segment (e.g., the number of words in the segment), identifying the corresponding scope, and determining the match type of the segment. In some embodiments, one or more of the class, scope, size, and match type may have already been determined and associated with the segment or Edit Log 175 (e.g., as a linguistic marker, in metadata, and the like).

The method 800 continues to block 820, where the Mapper Component 140 determines the size of the selected segment. As above, this may be determined based on a tag or marker that was previously associated with the segment. At block 825, the Mapper Component 140 determines the number of words in all Edit Logs 175 included in the class of the selected segment. That is, if the segment is in $Class_S^M$, the Mapper Component 140 determines $Words_S^M$. The method 800 then proceeds to block 830, where the Mapper Component 140 determines the weight of the selected segment. In an embodiment, the weight of the particular segment "i" is based on the size of the segment as compared to the size of the segment class. In one embodiment, the segment weight of the ith segment is defined as SegmentWeight(i). If segment "i" is in Class$_S^M$, the SegmentWeight(i) is defined according to Formula 4, below:

$$SegmentWeight(i) = \frac{SegmentWords(i)}{Words_S^M} \quad \text{Formula 4}$$

Once the segment weight has been determined, the method 800 proceeds to block 835, where the Mapper Component 140 determines the linguistic noise for the class of the selected segment. This may be accomplished as discussed above with reference to FIG. 7 and Formula 3. The method 800 then continues to block 840, where the Mapper Component 140 computes the linguistic noise of the particular selected segment. In an embodiment, the linguistic noise of a particular segment is given by LinguisticNoise(i), where segment "i" is in Class$_S^M$. In an embodiment, LinguisticNoise(i) is defined according to Formula 5, below:

LinguisticNoise(i)=
LinguisticNoise$_S^M$*SegmentWeight(i)  Formula 5

In this way, the linguistic noise of a particular source segment in an Edit Log 175 can be determined, based in part on the linguistic noise of the class to which the segment belongs (which is further based in part on the linguistic vector associated with the class). In one embodiment, the linguistic noise of each particular segment is utilized when determining the quality of translations, as will be discussed in more detail below. Additionally, in an embodiment, the linguistic noise of each segment is used to generate Pattern Models 180, as will be discussed in more detail below. After computing the linguistic noise for the particular selected segment, the method 800 proceeds to block 845 where the Mapper Component 140 determines whether there are additional segments (e.g., additional Edit Logs 175) to be processed. If so, the method 800 returns to block 810. If not (e.g., all of the Edit Logs 175 now have a calculated linguistic noise), the method 800 terminates at block 850.

Figure 9:
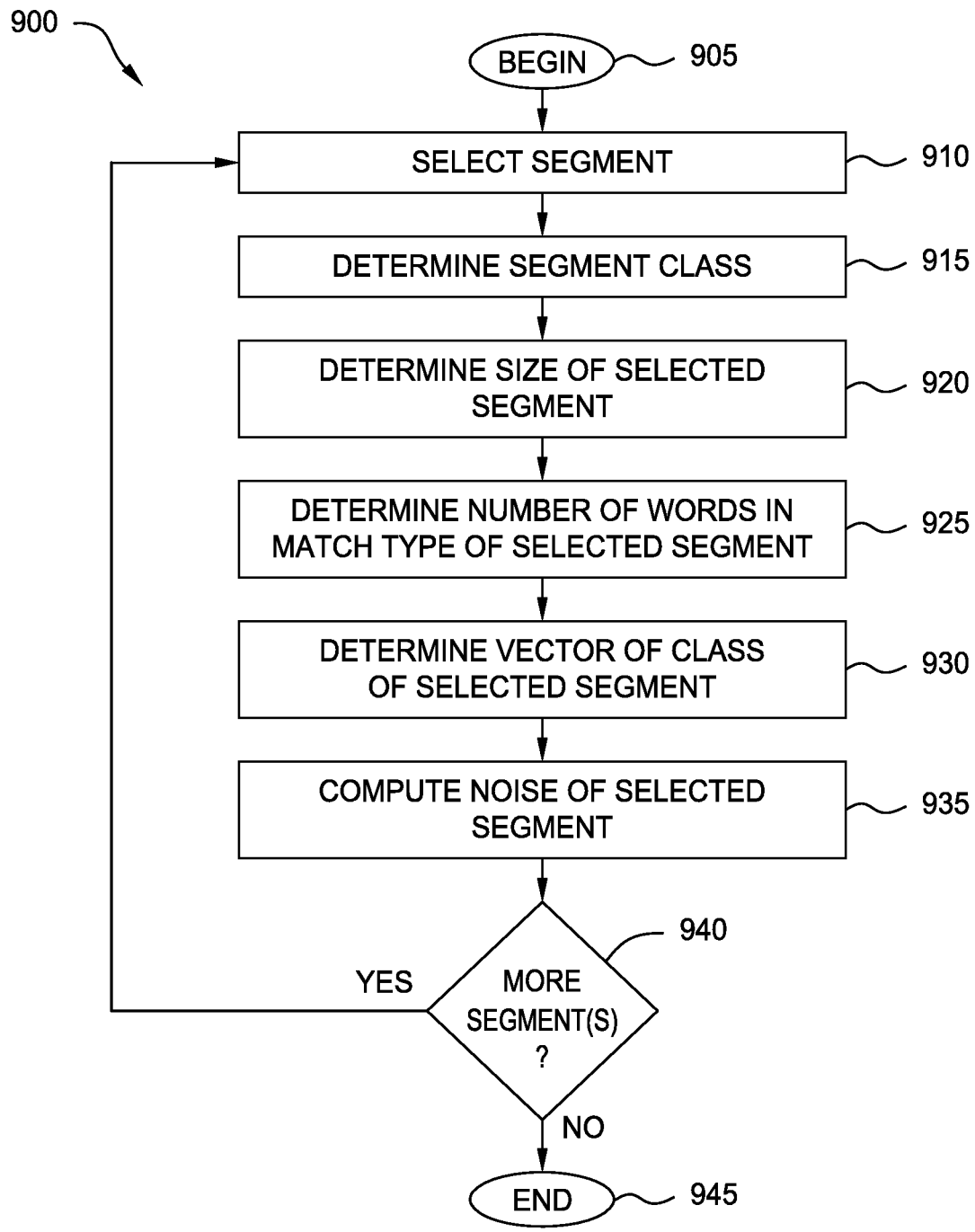
FIG. 9 is a flow diagram illustrating a method of computing linguistic noise of a particular segment, according to one embodiment of the present disclosure.

FIG. 9 is a flow diagram illustrating a method 900 of computing linguistic noise per segment, according to one embodiment of the present disclosure. In the method 900, linguistic noise can be calculated based on a different algorithm, as compared to the method 800 and Formula 5. The method 900 begins at block 905. At block 910, the Mapper Component 140 selects a segment to process. As above, this may comprise selecting an Edit Log 175 for processing and retrieving the source segment. At block 915, the Mapper Component 140 determines the class of the segment, and at block 920, the Mapper Component 140 determines the size of the selected segment. As discussed above, this may be accomplished via tags or markers associated with the segment or Edit Log 175. At block 930, the Mapper Component 140 determines the linguistic vector for the determined class. This may be accomplished as explained with reference to FIGS. 4 and 5, and Formula 2. Finally, based on these variables, the Mapper Component 140 computes the linguistic noise of the selected segment at block 935. In this embodiment, the linguistic noise is defined by Formula 6, below:

$$LinguisticNoise(i) = SegmentWords(i) * \frac{LinguisticVectors_S^M}{Words_S^M} \quad \text{Formula 6}$$

Notably, the method 900 does not require calculation of the class linguistic noise, but instead is calculated directly based on the class linguistic vector. Once the segment's linguistic noise is computed, the Mapper Component 140 determines whether there are additional segments (e.g., additional Edit Logs 175) that remain to be processed. If so, the method 900 returns to block 910 to select another segment. If not, the method 900 terminates at block 945.

Figure 10:
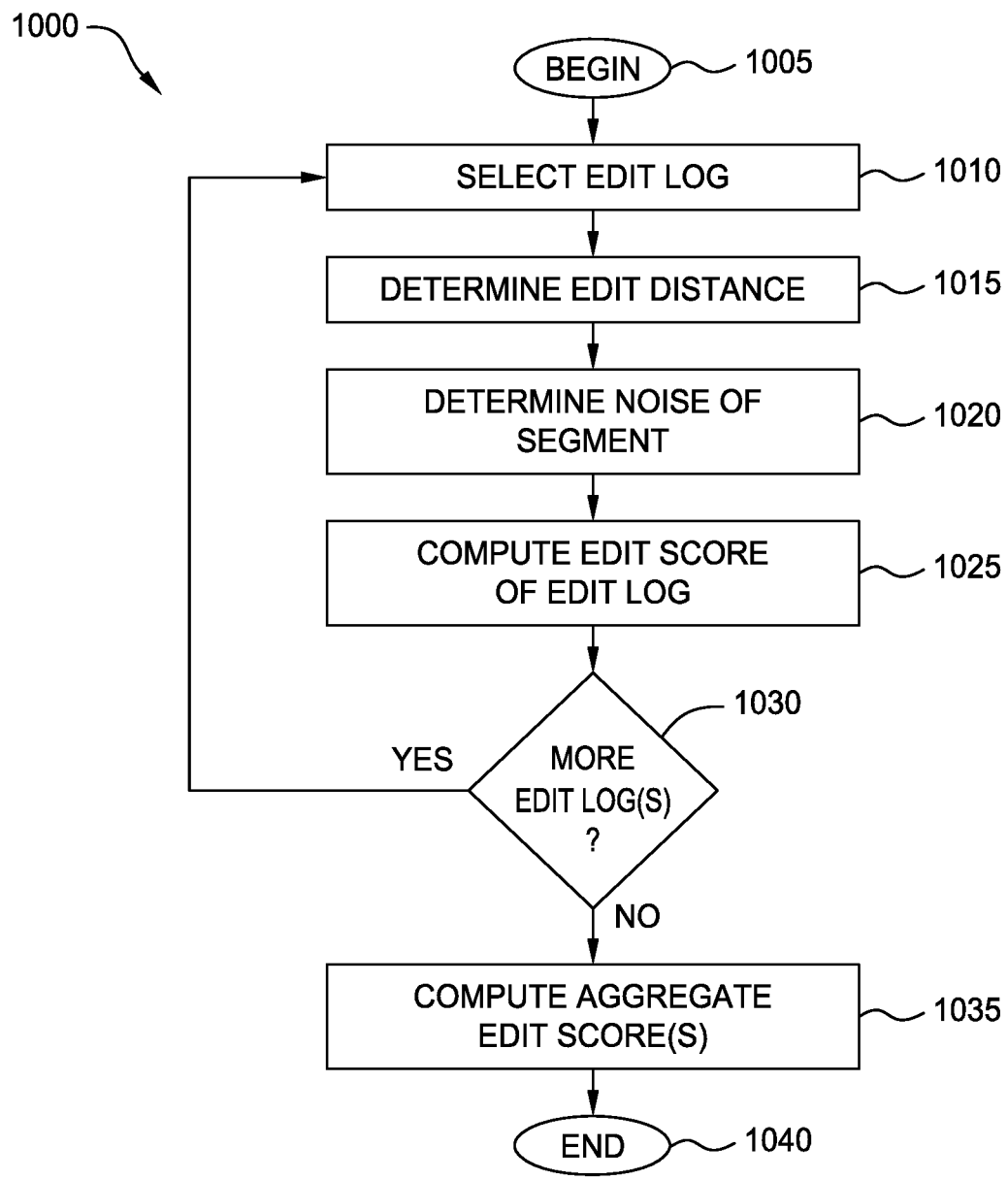
FIG. 10 is a flow diagram illustrating a method of generating aggregated edit scores, according to one embodiment of the present disclosure.

FIG. 10 is a flow diagram illustrating a method 1000 of generating and aggregating edit scores, according to one embodiment of the present disclosure. The method 1000 begins at block 1005. At block 1010, the Mapper Component 140 selects an Edit Log 175. At block 1015, the Mapper Component 140 determines the edit distance of the Edit Log 175. In an embodiment, the edit distance refers to the difference between the initial translation (i.e., provided by a match identified in the Translation Memory 160, or by a machine translation model) and the corresponding final translation, as included in the Edit Log 175. In one embodiment, the edit distance is the Levenshtein distance between the initial translation and final translation. For example, if the initial translation is "best" and the final translation is "rest," the edit distance may be one, because one substitution is sufficient to transform the initial translation to the final translation. In some embodiments, edit scores are only determined for Edit Logs 175 that utilized machine translation (i.e., for segments that have a match type of "machine" or "machine translation"). In such an embodiment, segments with other match types may be ignored for purposes of the method 1000.

The method 1000 then proceeds to block 1020, where the Mapper Component 140 determines the linguistic noise of the source segment of the selected Edit Log 175. This may be accomplished based on method 800 or method 900 above, or Formula 5 or 6. The method 1000 continues to block 1025, where the Mapper Component 140 computes the edit score of the Edit Log 175. In one embodiment, the edit score of an edit log "i" is given by EditScore(i), and is defined according to Formula 7 below, where the edit distance of the ith segment is given by EditDistance(i):

EditScore(i)=LinguisticNoise(i)*EditDistance(i)  Formula 7

The method 1000 then proceeds to block 1030, where the Mapper Component 140 determines whether there are additional Edit Logs 175 to process. If so, the method 1000 returns to block 1010 to select an Edit Log 175. If not, the method 1000 proceeds to block 1035, where the Mapper Component 140 computes aggregate edit score(s). For example, in one embodiment, the Mapper Component 140 computes the sum of the edit scores of each Edit Log 175 associated with each class in order to generate an aggregate edit score for each class. In various embodiments, the aggregate edit score may be based on the mean, average, or median edit score of the appropriate Edit Logs 175. As discussed above, in some embodiments, edit scores are only generated for segments with match type corresponding to machine translation. In such an embodiment, a single aggregate edit score may be generated based on the determined edit scores for all Edit Logs 175 with match type corresponding to machine translation. In some embodiments, the Mapper Component 140 generates an aggregate edit score for each scope, for one or more match types. In one embodiment, the Mapper Component 140 generates an aggregate edit score for each scope of segment, based on Edit Logs 175 associated with machine translation matches. For example, if three scopes are used (small, medium, and large), the Mapper Component 140 may generate a scope edit score for small segments that used machine translation, a scope edit score for medium segments that used machine translation, and a scope edit score for large segments that used machine translation.

In an embodiment, the aggregate edit score of a particular scope or class can be used to assess the quality of translations for the corresponding scope or class. For example, a higher aggregate edit score indicates increased noise and edit distance, while a lower aggregate edit score indicates a lower linguistic noise. In some embodiments, when new segments are received, they are not eligible for conversion to "excellent" match unless the aggregate edit score for the corresponding scope exceeds a predefined threshold. That is, in one embodiment, when a new segment is processed by the Checker Component 135 and Reviewer Component 145, the Checker Component 135 and Reviewer Component 145 first determine whether the aggregate edit score for the corresponding scope exceeds a predefined threshold. If so, the Checker Component 135 and Reviewer Component 145 may proceed to process the segment with the appropriate Pattern Model 180. If the aggregate edit score does not exceed the threshold, the Checker Component 135 and Reviewer Component 145 may determine that segments of the corresponding scope are not an excellent match, even without applying the Pattern Model 180.

Figure 11:
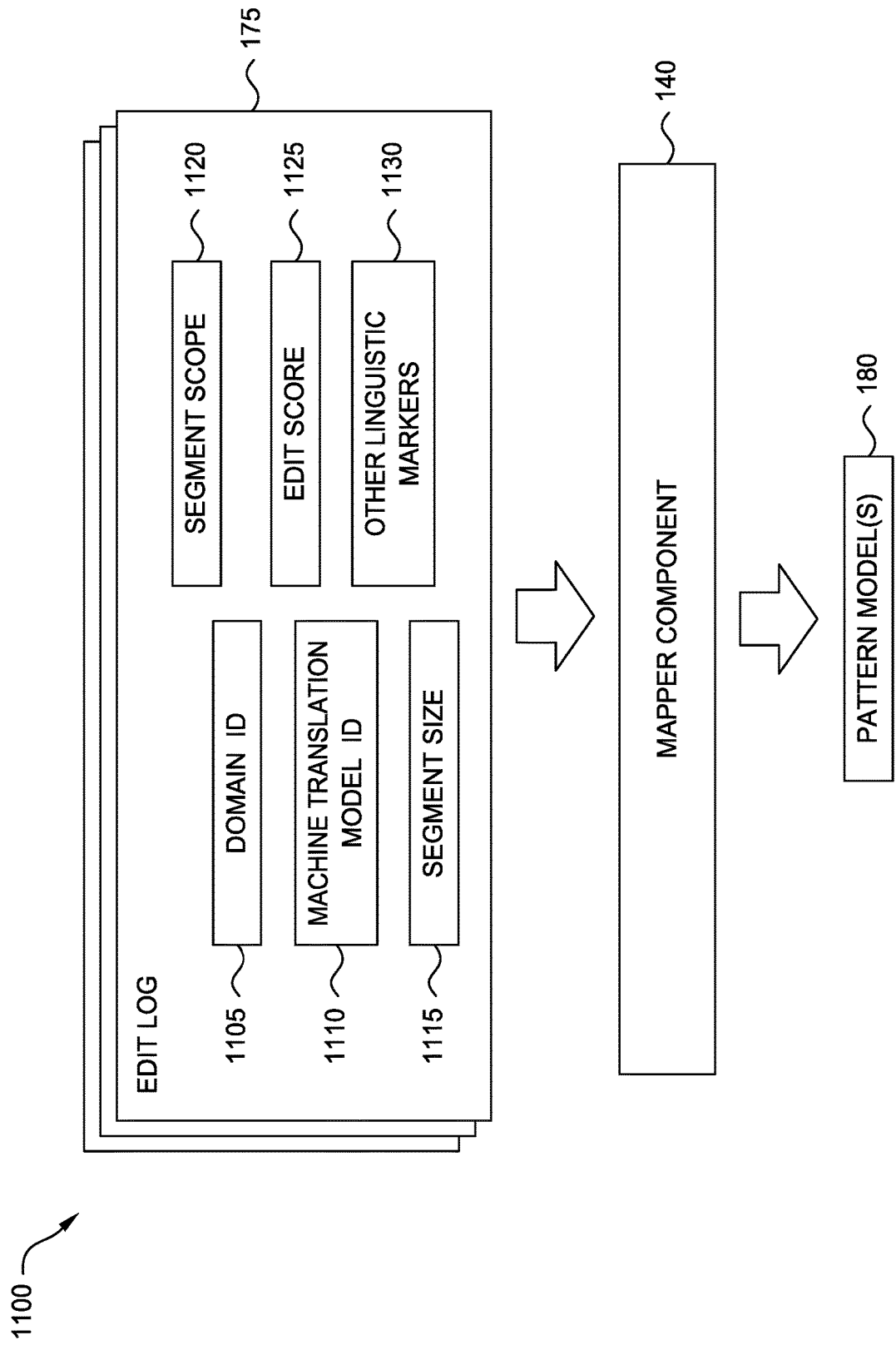
FIG. 11 is a block diagram illustrating a method for generating a pattern model, according to one embodiment disclosed herein.

FIG. 11 is a block diagram illustrating a method 1100 for generating a Pattern Model 180, according to one embodiment disclosed herein. In the illustrated embodiment, the Mapper Component 140 receives or retrieves a number of Edit Logs 175, each containing various data, and generates one or more Pattern Models 180. In the illustrated embodiment, the Mapper Component 140 considers the Domain ID 1105, Machine Translation Model ID 1110, Segment Size 1115, Segment Scope 1120, Edit Score 1125, and Other Linguistic Markers 1130. In the illustrated embodiment, the Domain ID 1105 refers to the domain of the Edit Log 175 (i.e., the domain of the source segment). In one embodiment, a different Pattern Model 180 is generated for each Domain ID 1105. For example, segments associated with a healthcare domain may be processed according to a different Pattern Model 180 than segments associated with a legal domain.

In the illustrated embodiment, the Machine Translation Model ID 1110 refers to the particular machine translation model that was used to generate the translation. In some embodiment, as discussed above, Pattern Model(s) 180 are only generated for use with new segments that are to be processed (or have been processed) with machine translation. The Segment Size 1115 refers to the number of words in the source segment of the Edit Log 175, and the Segment Scope 1120 refers to the source segment scope. The Edit Score 1125 may be determined for the Edit Log 175, as discussed above. Finally, Other Linguistic Markers 1130 can include any other linguistic markers that may be useful to building a more accurate model, such as markers or tags relating to punctuation, syntax, grammar, formatting (e.g., bold, italics), and the like. In some embodiments, the Other Linguistic Markers 1130 include tags indicating patterns or attributes of the content, such as whether a word is masculine or feminine, or singular or plural. In an embodiment, these linguistic markers are inserted during the linguistic optimization processing or by the Checker Component 140. In one embodiment, the Mapper Component 140 generates a map table based on the Edit Logs 175, and builds the Pattern Model(s) 180 based on the map table. In an embodiment, the map table may include the final translation, initial translation (e.g., machine translation), scope and size of the source segment, edit score, other linguistic markers, and the like.

In an embodiment, when new segments are to be processed via a Pattern Model 180, one or more variables can be identified and used. For example, in one embodiment, the Smart Edit Application 130 may determine the Domain ID 1105 of the new segment, and the Machine Translation Model ID 1110 that was used (or is to be used) to generate the initial translation. Further, in an embodiment, the Smart Edit Application 130 may determine the size and scope of the new segment, and any other identified linguistic markers. In one embodiment, when processing a new source segment, the Smart Edit Application 130 may utilize the aggregate edit score corresponding to the scope of the new segment.

In one embodiment, the Mapper Component 140 builds a rules-based table for the Pattern Model 180. For example, in such an embodiment, Smart Edit Application 130 may determine the appropriate Pattern Model 180 to use (or the appropriate row(s) in the Pattern Model 180 table) based on the Domain ID 1105 and Machine Translation Model ID 1110 associated with the new segment. Then, based on one or more of the Segment Size 1115, Segment Scope 1120, Other Linguistic Markers 1130, and aggregate scope edit score corresponding to the new segment, the Smart Edit Application 130 can identify the appropriate row in the rules-based table. That is, in such an embodiment, the Smart Edit Application 130 searches for a row in the Pattern Model 180 that corresponds to segments with the identified Domain ID 1105, Machine Translation Model ID 1110, and Segment Scope 1120. In some embodiments, the Pattern Model 180 may further specify the Segment Size and other factors, as discussed above. Once the row is identified, in such an embodiment, the Smart Edit Application 130 determines the s-score associated with the identified row. As discussed above, in one embodiment, the s-score is a binary result indicating whether the segment should be flagged as an "excellent" match or not. In some embodiments, the s-score is a value that is compared to one or more predefined thresholds to determine whether the segment should be marked as "excellent."

In one embodiment, the Mapper Component 140 builds a predictive Pattern Model 180 by applying analytical modeling techniques based on the map table. In some embodiments, some portion of the map table (i.e., some percentage of the Edit Logs 175) may be set aside as validation data while the remainder is used as training data. In one embodiment, one or more modeling algorithms may be utilized to generate a number of Pattern Models 180. The most accurate of these can then be identified using the validation data. In this way, the identified Pattern Model(s) 180 can be used to process new segments, in order to identify excellent segments that need no further processing.

In some embodiments, the maturity of the system (i.e., of the machine translation model(s)) is determined and tracked over time to ensure that the generated machine translations are high quality. In some embodiments, the maturity of the machine translation model is tracked for each scope. For example, as discussed above, small segments tend to exhibit less linguistic noise than larger segments, and a machine translation model may therefore reach maturity with respect to small segments before it does so with respect to larger segments. In some embodiments, the Checker Component 135 and/or Reviewer Component 145 may only identify excellent segments if the maturity of the corresponding scope exceeds a predefined threshold. In some embodiments, the maturity of the machine translation model with respect to each scope or class is defined based on the aggregate edit score for the scope or class. In some embodiments, the maturity is defined based on the linguistic vector for the corresponding scope or class. For example, in one embodiment, the $Maturity_S^M$ of a machine translation model for a particular $Class_S^M$ is given by formula 8, below:

$$Maturity_S^M = \frac{LinguisticVectors_S^M}{Words^M} \quad \text{Formula 8}$$

In some embodiments, the Pattern Models 180 may be periodically refined, or new Pattern Models 180 may be periodically generated. For example, as translations are completed, additional Edit Logs 175 and entries in the Translation Memory 160 may be added. Similarly, the machine translation models may be refined with this additional data. In one embodiment, the linguistic vectors are periodically recalculated for each class or scope, and the edit scores may be recomputed. Similarly, in an embodiment, the maturity of the machine translation models may be recomputed in order to verify that the machine translations are of sufficient quality.

Figure 12:
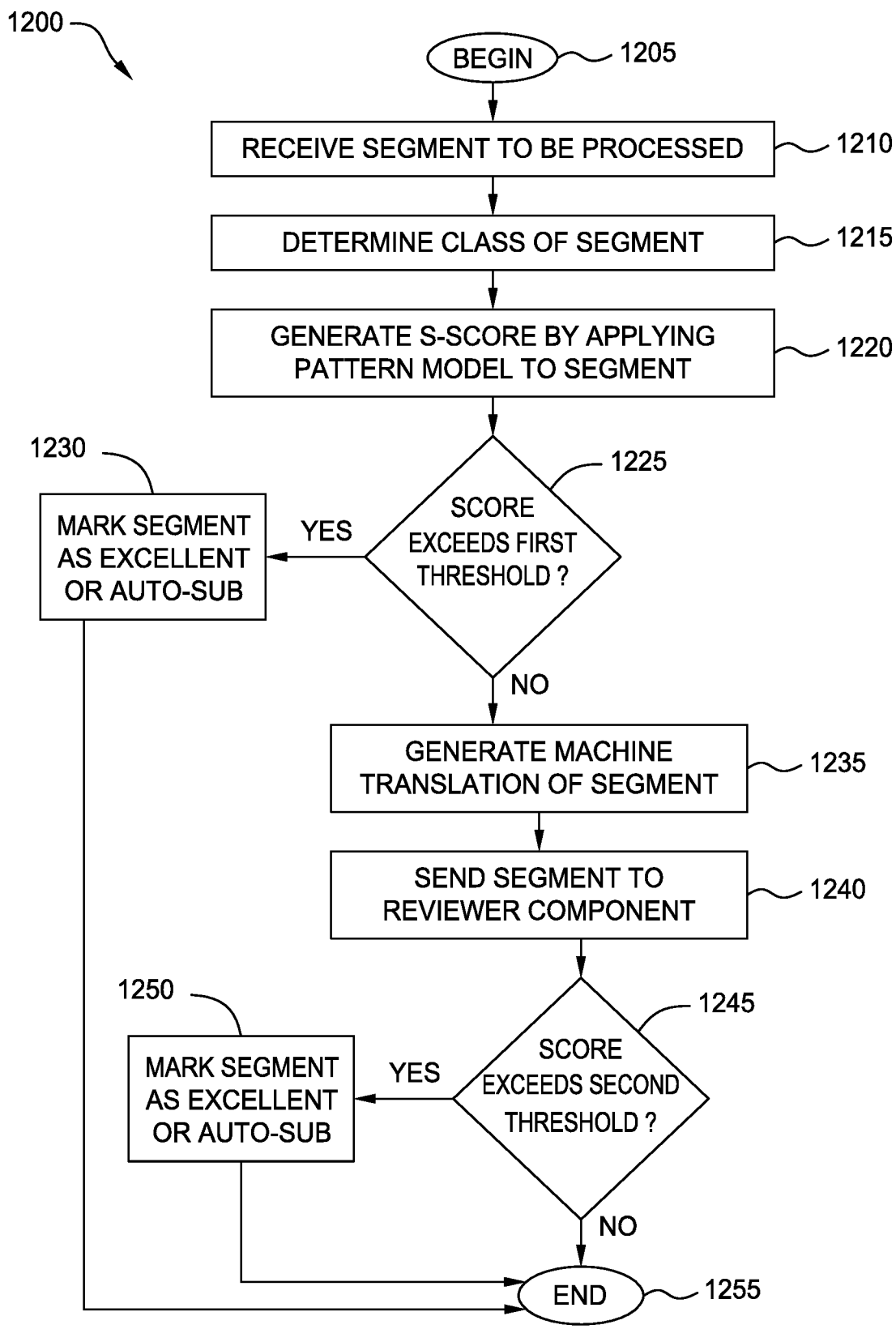
FIG. 12 is a flow diagram illustrating a method of processing segments to be translated, according to one embodiment of the present disclosure.

FIG. 12 is a flow diagram illustrating a method 1200 of processing segments to be translated, according to one embodiment of the present disclosure. The method 1200 begins at block 1205. At block 1210, the Smart Edit Application 130 receives a new segment to be processed. At block 1215, the Smart Edit Application 130 determines the class of the new segment. For example, the Checker Component 135 may identify the match type and scope of the segment after it has been processed by the linguistic optimizer. The method 1200 proceeds to block 1220, where the Smart Edit Application 130 generates an s-score by processing the new segment with a Pattern Model 180. In one embodiment, the Pattern Model 180 may be selected based on the segment's class, domain, scope, match type, and the like. As discussed above, in some embodiments, Pattern Models 180 are only used to analyze new segments with a match type corresponding to machine translations. In such an embodiment, the operations included in block 1220 may only be applied if it is determined that the segment has a match type of "machine translation" or "no match" (e.g., because it is to be processed via a machine translation model but has not yet reached that point in the TSC).

The method 1200 then proceeds to block 1225, where the Smart Edit Application 130 determines whether the generated s-score exceeds a first threshold. In some embodiments, the s-score is a binary value, and this step simply determines what that value is. In other embodiments, the s-score is a value in a range. If the s-score exceeds the first threshold (e.g., it is above the first threshold, or it is a "yes"), the method 1200 proceeds to block 1230, where the Smart Edit Application 130 (e.g., the Checker Component 135) marks the segment as excellent or auto-substitution. As discussed above, in some embodiments, segments marked as "excellent" may be subject to reduced downstream processing. For example, in one embodiment, segments marked as "excellent" may be subject only to proofreading, or may be finalized with no further review or processing required. In such an embodiment, the segment may have a translation generated based on a Dictionary 165, for example. As illustrated, the method then proceeds to block 1255, where it terminates. In some embodiments, however, these segments may be additionally processed by a reduced downstream operations, such as a light post edit process.

If it is determined, at block 1225, that the segment is not "excellent," the method 1200 proceeds to block 1235, where a machine translation is generated for the segment. As discussed above, in some embodiments, only machine match segments are processed with the Pattern Models 180 to determine whether they can be marked as "excellent." In some embodiments, however, all segments may be processed via Pattern Models 180. In such an embodiment, there may be no need to generate the machine translation, if a match has already been identified. At block 1240, the segment is transmitted to the Reviewer Component 145. At block 1245, the Reviewer Component 145 again analyzes the segment with a Pattern Model 180 to determine whether the s-score exceeds a second threshold. In some embodiments, the Reviewer Component 145 may utilize a different Pattern Model 180 or different threshold than the Checker Component 135. If this renewed analysis determines that the segment should be marked "excellent," such that no further processing is required, the method 1200 proceeds to block 1250, where the segment is flagged as "excellent" or "auto-sub" and the method terminates at block 1255. Otherwise, the method proceeds to block 1255 to terminate, and the segment is sent for downstream processing (i.e., post edit).

Figure 13:
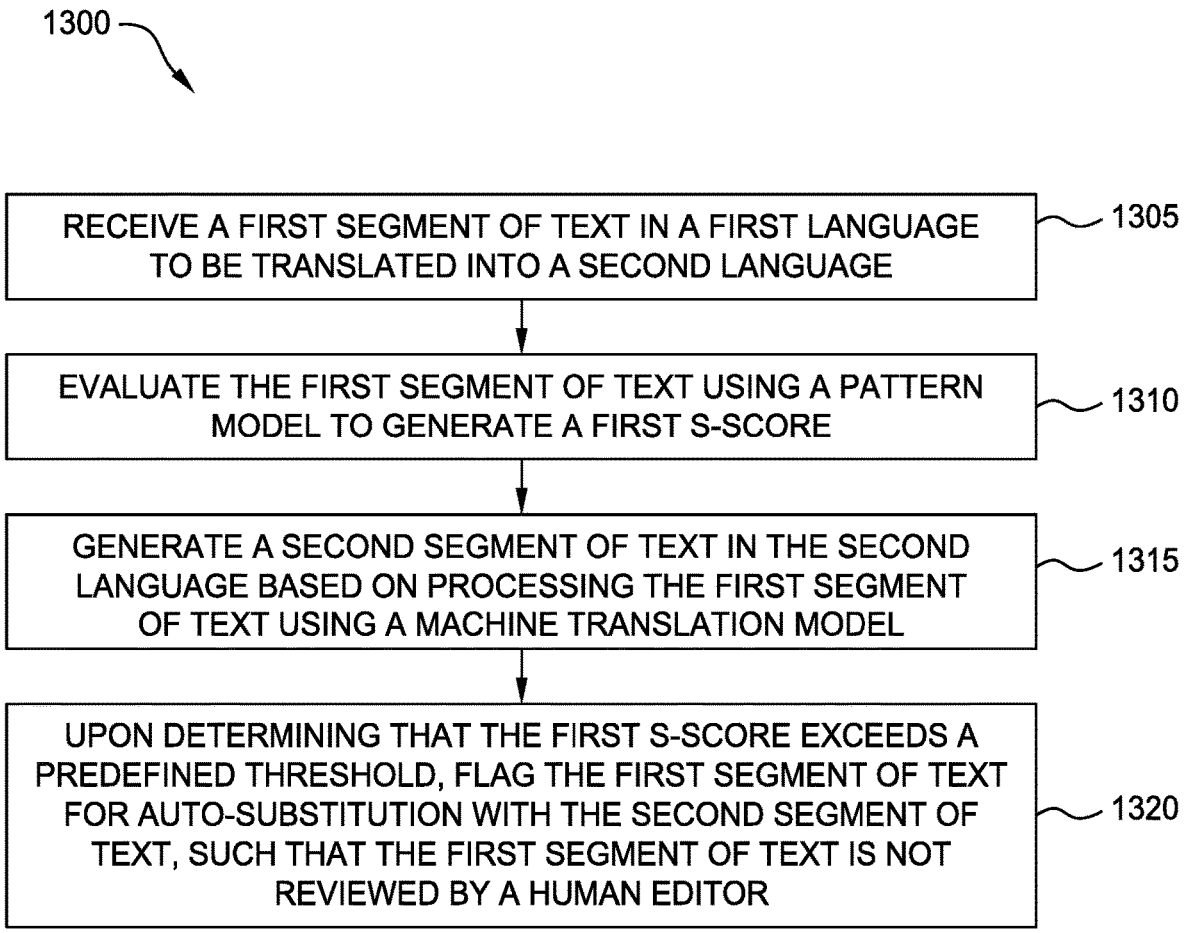
FIG. 13 is a flow diagram illustrating a method of processing text in an optimized translation workflow, according to one embodiment of the present disclosure.

FIG. 13 is a flow diagram illustrating a method 1300 of processing text in an optimized translation workflow, according to one embodiment of the present disclosure. The method 1300 begins at block 1305, where the Smart Edit Application 130 receives a first segment of text in a first language to be translated into a second language. At block 1310, the Smart Edit Application 130 evaluates the first segment of text using a pattern model to generate a first s-score. The method 1300 continues to block 1315, where the Smart Edit Application 130 generates a second segment of text in the second language based on processing the first segment of text using a machine translation model. Finally, at block 1320, upon determining that the first s-score exceeds a predefined threshold, the Smart Edit Application 130 flags the first segment of text for auto-substitution with the second segment of text, such that the first segment of text is not reviewed by a human editor.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the preceding features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s). Likewise, reference to "the invention"

shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the Smart Edit Application 130) or related data available in the cloud. For example, the Smart Edit Application 130 could execute on a computing system in the cloud and process content to be translated. In such a case, the Smart Edit Application 130 could generate and store Pattern Models 180 at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method for optimizing a translation workflow, comprising:
receiving a first segment of text in a first language to be translated into a second language;
evaluating, by operation of one or more processors, the first segment of text using a pattern model to generate a first s-score, wherein the pattern model is generated based on aggregate edit scores for a plurality of classes, wherein the aggregate edit scores are based on a plurality of edit scores for a plurality of edit logs, wherein each of the plurality of edit logs is associated with a class in the plurality of classes, and wherein the plurality of classes are defined based on scope and match type;
generating a second segment of text in the second language based on processing the first segment of text using a machine translation model; and
upon determining that the first s-score exceeds a predefined threshold, flagging the first segment of text for auto-substitution with the second segment of text, such that the first segment of text is not reviewed by a human editor.

2. The method of claim 1, wherein evaluating the first segment of text using the pattern model is based at least in part on a size of the first segment of text and a scope of the first segment of text.

3. The method of claim 1, further comprising generating the pattern model by:
generating the plurality of edit scores for the plurality of edit logs;
for each respective class of the plurality of classes, generating a respective aggregate edit score based on edit scores associated with edit logs corresponding to the respective class; and
generating the pattern model based at least in part on the aggregate edit scores.

4. The method of claim 3, wherein generating the plurality of edit scores comprises, for each respective edit log in the plurality of edit logs:
determining a respective edit distance between a respective source segment and a respective translated segment;
determining a respective noise value of the respective edit log; and
generating a respective size score based on the respective edit distance and respective noise value.

5. The method of claim 4, wherein determining the respective noise value of the respective edit log comprises:
determining a size of the respective source segment;
identifying a class of the respective edit log;
determining a linguistic vector for the identified class; and
generating the respective noise value of the respective edit log based at least in part on the determined size and the determined linguistic vector.

6. The method of claim 5, wherein determining the linguistic vector for the identified class comprises:
identifying a first subset of the plurality of edit logs, wherein each edit log in the first subset of edit logs is associated with the identified class;
determining a percentage of edit logs in the first subset of edit logs that were accepted without change;
determining a weighted efficiency of one or more human editors when processing the first subset of edit logs; and
generating the linguistic vector based at least in part on the determined percentage and the determined weighted efficiency.

7. The method of claim 1, the method further comprising:
receiving a third segment of text in the first language to be translated to the second language;
evaluating the third segment of text using the pattern model to generate a second s-score;
upon determining that the second s-score exceeds the predefined threshold, flagging the third segment of text for auto-substitution, such that the third segment of text is not reviewed by a human editor and is not processed with the machine translation model.

8. The method of claim 1, the method further comprising:
receiving a third segment of text in the first language to be translated to the second language;
evaluating the third segment of text using the pattern model to generate a second s-score;
generating a fourth segment of text in the second language based on processing the first segment of text using a machine translation model;
upon determining that the second s-score does not exceed the predefined threshold, flagging the third segment of text for review by a human editor.

9. The method of claim 1, wherein the predefined threshold is based at least in part on a determined maturity of the machine translation model.

10. A system, comprising:
one or more computer processors; and
a memory containing a program which when executed by the one or more computer processors performs an operation for optimizing a translation workflow, the operation comprising:
  receiving a first segment of text in a first language to be translated into a second language;
  evaluating the first segment of text using a pattern model to generate a first s-score, wherein the pattern model is generated based on aggregate edit scores for a plurality of classes, wherein the aggregate edit scores are based on a plurality of edit scores for a plurality of edit logs, wherein each of the plurality of edit logs is associated with a class in the plurality of classes, and wherein the plurality of classes are defined based on scope and match type;
  generating a second segment of text in the second language based on processing the first segment of text using a machine translation model; and
  upon determining that the first s-score exceeds a predefined threshold, flagging the first segment of text for auto-substitution with the second segment of text, such that the first segment of text is not reviewed by a human editor.

11. The system of claim 10, the operation further comprising generating the pattern model by:
  generating the plurality of edit scores for the plurality of edit logs;
  for each respective class of the plurality of classes, generating a respective aggregate edit score based on edit scores associated with edit logs corresponding to the respective class; and
  generating the pattern model based at least in part on the aggregate edit scores.

12. The system of claim 11, wherein generating the plurality of edit scores comprises, for each respective edit log in the plurality of edit logs:
  determining a respective edit distance between a respective source segment and a respective translated segment;
  determining a respective noise value of the respective edit log; and
  generating a respective size score based on the respective edit distance and respective noise value.

13. The system of claim 12, wherein determining the respective noise value of the respective edit log comprises:
  determining a size of the respective source segment;
  identifying a class of the respective edit log;
  determining a linguistic vector for the identified class; and
  generating the respective noise value of the respective edit log based at least in part on the determined size and the determined linguistic vector.

14. The system of claim 13, wherein determining the linguistic vector for the identified class comprises:
  identifying a first subset of the plurality of edit logs, wherein each edit log in the first subset of edit logs is associated with the identified class;
  determining a percentage of edit logs in the first subset of edit logs that were accepted without change;
  determining a weighted efficiency of one or more human editors when processing the first subset of edit logs; and
  generating the linguistic vector based at least in part on the determined percentage and the determined weighted efficiency.

15. The system of claim 10, the operation further comprising:
  receiving a third segment of text in the first language to be translated to the second language;
  evaluating the third segment of text using the pattern model to generate a second s-score;
  generating a fourth segment of text in the second language based on processing the first segment of text using a machine translation model;
  upon determining that the second s-score does not exceed the predefined threshold, flagging the third segment of text for review by a human editor.

16. A computer program product comprising a computer-readable storage medium having computer-readable program code embodied therewith, the computer-readable program code executable by one or more computer processors to perform an operation for optimizing a translation workflow, the operation comprising:
  receiving a first segment of text in a first language to be translated into a second language;
  evaluating the first segment of text using the pattern model to generate a first s-score, wherein the pattern model is generated based on aggregate edit scores for a plurality of classes, wherein the aggregate edit scores are based on a plurality of edit scores for a plurality of edit logs, wherein each of the plurality of edit logs is associated with a class in the plurality of classes, and wherein the plurality of classes are defined based on scope and match type;
  generating a second segment of text in the second language based on processing the first segment of text using a machine translation model; and
  upon determining that the first s-score exceeds a predefined threshold, flagging the first segment of text for auto-substitution with the second segment of text, such that the first segment of text is not reviewed by a human editor.

17. The computer program product of claim 16, the operation further comprising wherein generating the pattern model by:
  generating the plurality of edit scores for the plurality of edit logs;
  for each respective class of the plurality of classes, generating a respective aggregate edit score based on edit scores associated with edit logs corresponding to the respective class; and
  generating the pattern model based at least in part on the aggregate edit scores.

18. The computer program product of claim 17, wherein generating the plurality of edit scores comprises, for each respective edit log in the plurality of edit logs:
  determining a respective edit distance between a respective source segment and a respective translated segment;
  determining a respective noise value of the respective edit log; and
  generating a respective size score based on the respective edit distance and respective noise value.

19. The computer program product of claim 18, wherein determining the respective noise value of the respective edit log comprises:
  determining a size of the respective source segment;
  identifying a class of the respective edit log;
  determining a linguistic vector for the identified class by:
    identifying a first subset of the plurality of edit logs, wherein each edit log in the first subset of edit logs is associated with the identified class;
    determining a percentage of edit logs in the first subset of edit logs that were accepted without change;

determining a weighted efficiency of one or more human editors when processing the first subset of edit logs; and generating the linguistic vector based at least in part on the determined percentage and the determined weighted efficiency; and generating the respective noise value of the respective edit log based at least in part on the determined size and the determined linguistic vector.

20. The computer program product of claim 16, the operation further comprising:

retrieving a plurality of edit logs, each comprising a respective source segment and a respective translated segment; and generating a pattern model based at least in part on the plurality of edit logs.

\* \* \* \* \*